US012084913B1

(12) United States Patent
Flannery et al.

(10) Patent No.: US 12,084,913 B1
(45) Date of Patent: Sep. 10, 2024

(54) GATED BARRIER WITH LIFT LOCK

(71) Applicant: Regalo International, LLC, Burnsville, MN (US)

(72) Inventors: Mark A. Flannery, Longboat Key, FL (US); Michael P. Lane, Chaska, MN (US)

(73) Assignee: Regalo International, LLC, Burnsville, MN (US)

( * ) Notice: Subject to any disclaimer, the term of this patent is extended or adjusted under 35 U.S.C. 154(b) by 0 days.

(21) Appl. No.: 18/377,822

(22) Filed: Oct. 8, 2023

Related U.S. Application Data

(63) Continuation of application No. 18/108,648, filed on Feb. 12, 2023, now Pat. No. 11,781,376, which is a continuation of application No. 17/517,613, filed on Nov. 2, 2021, now Pat. No. 11,578,529.

(51) Int. Cl.

| | |
|---|---|
| ***E06B 9/04*** | (2006.01) |
| ***E05C 1/00*** | (2006.01) |
| ***E05C 1/04*** | (2006.01) |
| ***E05D 15/58*** | (2006.01) |
| ***E06B 3/52*** | (2006.01) |
| *E06B 9/00* | (2006.01) |

(52) U.S. Cl.
CPC ................ *E06B 9/04* (2013.01); *E05C 1/006* (2013.01); *E05C 1/04* (2013.01); *E05D 15/581* (2013.01); *E06B 3/52* (2013.01); *E06B 2009/002* (2013.01)

(58) Field of Classification Search
CPC ........ E06B 9/04; E06B 3/52; E06B 2009/002; E06B 11/02; E06B 11/022; E05C 1/006; E05C 1/04; E05D 15/581
See application file for complete search history.

(56) References Cited

U.S. PATENT DOCUMENTS

| | | | | |
|---|---|---|---|---|
| 9,382,740 | B2 | 7/2016 | Flannery et al. | |
| 9,382,750 | B1 | 7/2016 | Flannery et al. | |
| 9,879,453 | B1 | 1/2018 | Flannery et al. | |
| 10,024,080 | B2 | 7/2018 | Marsden | |
| 10,378,277 | B2 | 8/2019 | Flannery | |
| 10,907,404 | B1 | 2/2021 | Flannery et al. | |
| 10,934,768 | B2 | 3/2021 | Flannery | |
| 11,035,173 | B1 | 6/2021 | Flannery | |
| 11,118,398 | B2 | 9/2021 | Kaiser | |
| 2006/0207180 | A1 | 9/2006 | Cheng | |
| 2008/0202047 | A1 | 8/2008 | Flannery | |
| 2009/0013604 | A1 | 1/2009 | Yates | |
| 2011/0225890 | A1* | 9/2011 | Greenwood | E05B 65/0007 49/394 |
| 2012/0055092 | A1 | 3/2012 | Boucquey | |
| 2012/0324792 | A1 | 12/2012 | Bertsch | |
| 2013/0221304 | A1 | 8/2013 | Wang | |
| 2014/0318018 | A1* | 10/2014 | Huang | E06B 9/04 49/386 |
| 2015/0101253 | A1 | 4/2015 | Marsden | |
| 2015/0184441 | A1 | 7/2015 | Linehan | |
| 2015/0259964 | A1 | 9/2015 | Linehan | |
| 2018/0148954 | A1* | 5/2018 | Raffi | E05B 59/00 |
| 2019/0136619 | A1 | 5/2019 | Flannery | |

(Continued)

*Primary Examiner* — Justin B Rephann

(57) ABSTRACT

The present lift lock includes a slide having feet and a slot between the feet, where such slide further includes an interior generally full length wall for acting as a stop, and where such slide further includes gripping ribs that increase in width from the front end of the slide to the rear end of the slide.

3 Claims, 15 Drawing Sheets

(56) References Cited

U.S. PATENT DOCUMENTS

| | | | | |
|---|---|---|---|---|
| 2020/0386049 | A1 | 12/2020 | Kaiser | |
| 2022/0065032 | A1* | 3/2022 | Morris .................. | E05B 1/0046 |
| 2023/0203878 | A1* | 6/2023 | Wang ........................ | E06B 9/02<br>160/84.06 |

* cited by examiner

GATED BARRIER WITH LIFT LOCK

This application is a continuation of U.S. patent application Ser. No. 18/108,648 filed Feb. 12, 2023 (U.S. Pat. No. 11,781,376 issued Oct. 10, 2023) and claims the benefit thereof under 35 U.S.C. § 120, which application is a continuation of U.S. patent application Ser. No. 17/517,613 filed Nov. 2, 2021 (U.S. Pat. No. 11,578,529 issued Feb. 14, 2023) and claims the benefit thereof under 35 U.S.C. § 120, all of which applications are hereby incorporated by reference their entireties into this application.

FIELD OF THE INVENTION

The present invention relates to a residential home barrier, particularly to a gate in the residential home barrier, and specifically to a gate that is swingable in the residential home barrier on a first axis and raiseable and lowerable in the residential home barrier on the first axis.

BACKGROUND OF THE INVENTION

A residential home barrier is a structure that may be placed at a location in a home or about an exterior of the home to restrict access to certain areas. For example, a residential home barrier may be placed at the top of a set of stairs to prevent a toddler from falling down the set of stairs. Or a residential home barrier may be placed in a fence about a swimming pool. Or a residential home barrier may be placed between a dining room and a kitchen to permit a caretaker to move freely in the kitchen without a dog underneath his or her feet.

It is preferable that a residential home barrier may be opened and closed easily by an older child, teenager, or adult, but not by a toddler, even one possessing extraordinary effort and talent. To a toddler, it is preferred that the residential home barrier presents an extreme challenge.

It is preferably that two or even three step operations must be performed prior to the step of swinging open a gate in a residential home barrier. At the same time, such two or three step operation cannot be unduly burdensome to the older child, teenager, or adult.

SUMMARY OF THE INVENTION

A feature of the present invention is the provision in a gated barrier of a first combination, where the first combination includes: a) a frame, the frame having an upper end portion and a lower end portion; b) a gate engaged to the frame such that the gate is swingable relative to the frame about a first axis; c) the gate being liftable relative to the frame such that the gate is liftable on the first axis; d) the gate having a proximal end and a distal free end; e) the proximal end of the gate being disposed between the upper end portion and the lower end portion of the frame, the proximal end of the gate being pivotally engaged to the frame for the swinging of the gate relative to the frame; f) a slide on the gate, the slide having first and second positions; g) the slide in the first position being disposed on the first axis and between the proximal end of the gate and the upper end portion of the frame such that the proximal end of the gate is not liftable to the upper end portion of the frame; h) the slide being slideable away from the first axis to the second position, the second position being an out-of-the-way position such that the proximal end of the gate is liftable to be adjacent to the upper end portion of the frame; i) the first axis being defined by a pivot member engaged to the frame; j) wherein the slide includes a slot for receiving the pivot member, the slot including a neck having a width less than a diameter of the pivot member, the slot including an opening inwardly of the neck and in communication with the neck, the opening being equal to or slightly larger than the diameter of the pivot member, such that the pivot member snaps into the opening through the neck when the slide is pushed into the first position; and k) wherein the slide includes a front wall and feet projecting forwardly of the front wall, the feet forming said slot.

Another feature of the present invention is the provision in a gated barrier of a second combination, where the second combination includes: a) a frame, the frame having an upper end portion and a lower end portion; b) a gate engaged to the frame such that the gate is swingable relative to the frame about a first axis; c) the gate being liftable relative to the frame such that the gate is liftable on the first axis; d) the gate having a proximal end and a distal free end; e) the proximal end of the gate being disposed between the upper end portion and the lower end portion of the frame, the proximal end of the gate being pivotally engaged to the frame for the swinging of the gate relative to the frame; f) a slide on the gate, the slide having first and second positions; g) the slide in the first position being disposed on the first axis and between the proximal end of the gate and the upper end portion of the frame such that the proximal end of the gate is not liftable to the upper end portion of the frame; h) the slide being slideable away from the first axis to the second position, the second position being an out-of-the-way position such that the proximal end of the gate is liftable to be adjacent to the upper end portion of the frame; i) a slide mount between the slide and the gate, the slide mount having a closed end; j) the slide being slideable to and away from the first axis on the slide mount; and k) wherein the slide includes an interior wall that extends from a location adjacent to a ceiling of the slide to a location adjacent to a bottom of the slide, the interior wall abutting the closed end of the slide mount and working as a stop for the slide to stop sliding of the slide when the slide is slid away from the first axis.

Another feature of the present invention is the provision in a gated barrier of a third combination, where the third combination includes: a) a frame, the frame having an upper end portion and a lower end portion; b) a gate engaged to the frame such that the gate is swingable relative to the frame about a first axis; c) the gate being liftable relative to the frame such that the gate is liftable on the first axis; d) the gate having a proximal end and a distal free end; e) the proximal end of the gate being disposed between the upper end portion and the lower end portion of the frame, the proximal end of the gate being pivotally engaged to the frame for the swinging of the gate relative to the frame; f) a slide on the gate, the slide having first and second positions; g) the slide in the first position being disposed on the first axis and between the proximal end of the gate and the upper end portion of the frame such that the proximal end of the gate is not liftable to the upper end portion of the frame; h) the slide being slideable away from the first axis to the second position, the second position being an out-of-the-way position such that the proximal end of the gate is liftable to be adjacent to the upper end portion of the frame; i) wherein the slide includes first and second sides, wherein the slide includes first and second ends, wherein each of the first and second sides includes an outer face, and wherein each of the outer faces includes a set of vertically extending ribs to provide a better grip by fingers, the vertically extending ribs being spaced apart from each other, each of the vertically extending ribs including an inner end where said vertically extending rib is engaged to the slide, each of the vertically extending ribs including an outer end, a distance from the inner end of said vertically extending rib to the outer end of said vertically extending rib being a length; j) wherein the vertically extending ribs on the first side of the slide increase in length as the vertically extending ribs extend from the first end to the second end; and k) wherein the vertically extending ribs on the second side of the slide increase in length as the vertically extending ribs extend from the first end to the second end.

An advantage of the first combination is a slot that requires less resistance as the slide is slid on to and off the pivot member. The less resistance is provided by lowering the height of the slot from extending up and down the slide to being located only at a bottom portion of the slide.

Another advantage of the first combination is that the slot stands out more visually. A new user of the gate more quickly recognizes how the slide works.

An advantage of the second combination is a strong intermediate or interior wall or stop that utilizes the height of the slide for abutting the closed end of the slide mount.

Another advantage of the second combination is that the strong intermediate or interior wall or stop serves double duty. The interior wall works not only as a stop but also holds side walls of the slide together so as to resist spreading of such side walls as the slide is slid onto the slide mount.

An advantage of the third combination is that the ribs of increasing length provide an easier pinch of the fingers for the user.

Another advantage of the third combination is that the ribs of increasing length provide a more aesthetic slide.

Another advantage of the third combination is that the ribs of increasing length provide a more ergonomic fit between the fingers and thumb of one hand since, when the fingers and thumb are pressed together, there is an oblique tapering apart of the finger skin surfaces and the thumb skin surfaces back toward the palm of the hand.

DESCRIPTION

Figure 1:
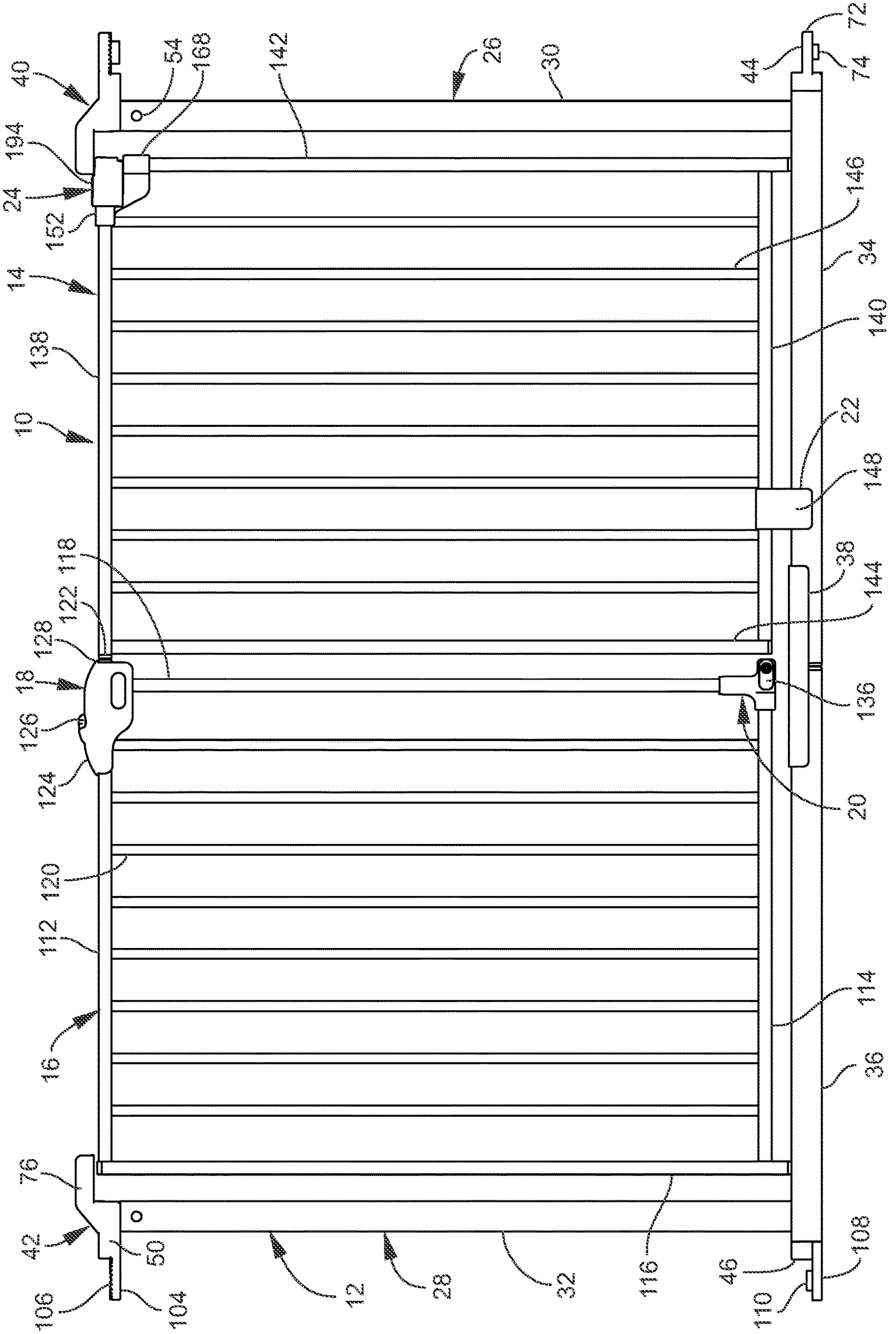
FIG. 1 is a front elevation view of the present gated barrier showing the lift lock in the upper right hand corner of the gate of the gated barrier, where the lift lock is in the first and locked position and the right hand gate is closed, locked against swinging, and latched to the left hand gate.

As shown in FIG. 1, a gated barrier 10 is indicated by reference number 10. Gated barrier 10 includes a generally U-shaped barrier frame 12 having a first gate 14 and a second gate 16. Gated barrier 10 further includes an upper latch apparatus 18, a lower latch apparatus 20, and an inverted U-shaped catch 22. Gated barrier 10 further includes a lift lock apparatus 24 engaged between the frame 12 and the first gate 14.

Barrier frame 12 includes a first frame end portion 26 and a second frame end portion 28. Each of the frame end portions 26, 28 are L-shaped. Frame end portions 26, 28 include respective generally vertical tubular standards 30, 32 and generally horizontal or transverse lowermost tubular frame member portions 34, 36. Frame member portions 34, 36 are engaged by an inverted U-shaped piece 38 such that frame member portions 34, 36 are essentially one-piece, such that frame end portions 26, 28 are essentially one-piece, and such that barrier frame 12 is essentially one-piece. Inverted U-shaped piece 38 is pinned to lowermost frame member portions 34, 36 and confronts the front, rear, and top faces of the lowermost frame member portions 34, 36. Lowermost frame member portions 34, 36 and inverted U-shaped piece 38 as a whole can be referred to as a lowermost frame member of the barrier frame 12. Frame end portions 26, 28 further include respective upper end frame portions 40, 42 and respective lower base connectors or lower end frame portions 44, 46.

Standards 30, 32 are rectangular in section and joined at a right angle to their respective lowermost horizontal frame member portions 34, 36. Frame member portions 34, 36 may be square or rectangular in section. The inner ends of lowermost horizontal frame member portions 34, 36 abut each other and may or may not be joined to each other. If joined, such inner ends may be joined by a male/female connection. Such a male/female connection may supplement the connection provided by the inverted U-shaped piece 38, or if desired the male/female connection may replace the inverted U-shaped piece 38.

Lowermost frame member portion 34 is set in a straight line with lowermost frame member portion 36. Lowermost frame member portions, 34, 36, standards 30, 32, barrier frame 12 as a whole are disposed in a common plane and define a plane.

Upper end frame portion 40 and base connector 44 work in combination as a connection to a fence or other structure. Upper end frame portion 42 and base connector 46 work in combination as a connection to a fence or other structure.

Upper end portion 40 of first end frame portion 26 is shown in FIGS. 10A, 10B, 10C, and 10D. Upper end portion 40 is integral and one-piece. Upper end portion 40 includes a base 48. Base 48 is parallelepiped in shape and depends from a body 50 of the upper end portion 40. Base 48 includes a through hole 52 extending from front to back therein for receiving a pin connector 54 holding upper end portion 40 to the standard 30. Standard 30 is tubular and includes an upper open end for receiving the base 48 therein. A lower edge 56 of the body 50 abuts the upper end of the standard 30 to stop further sliding of the base 48 into the standard 30. Base 48 is friction fit into the standard 30 and is placed therein in the proper orientation with the help of an elongate bar shaped key 58 that may slide into a vertical oriented slot on the inside of the standard 30. To aid in the friction fit, the front and back sides of base 58 include a set of horizontally extending protrusions 60 and the inner side of base 58 includes a set of laterally extending protrusions 62.

Upper end portion 40 includes a connection 64 extending integrally outwardly from the body 50 for connection to a structure such as fencing. Connection 64 is spaced from the base 48. Connection 64 includes a disk shaped portion 66 having on a bottom side a set of annular teeth 68 extending for 360 degrees. Connection 64 further includes a downwardly extending cylinder 70 that is coaxial with the disk shaped portion 66 and set of annular teeth 68. Connection 64 may engage a structure having an elongate member with a top portion that engages one or more of the teeth 68 and cylinder 70 and with a bottom portion that engages one or more of a bottom disk shaped portion 72 of base connector 44 and a cylinder 74 of base connector 44. Bottom disk shaped portion 72, cylinder 74, disk shaped portion 66, cylinder 70, and the set of annular teeth 68 are coaxial with each other. Such axis of the bottom disk shaped portion 72, cylinder 74, disk shaped portion 66, cylinder 70, and set of annular teeth 68 is placed forwardly of a plane defined by the barrier frame 12. Disk shaped portions 66, 72 are forwardly offset from such plane defined by the barrier frame 12.

Figure 6:
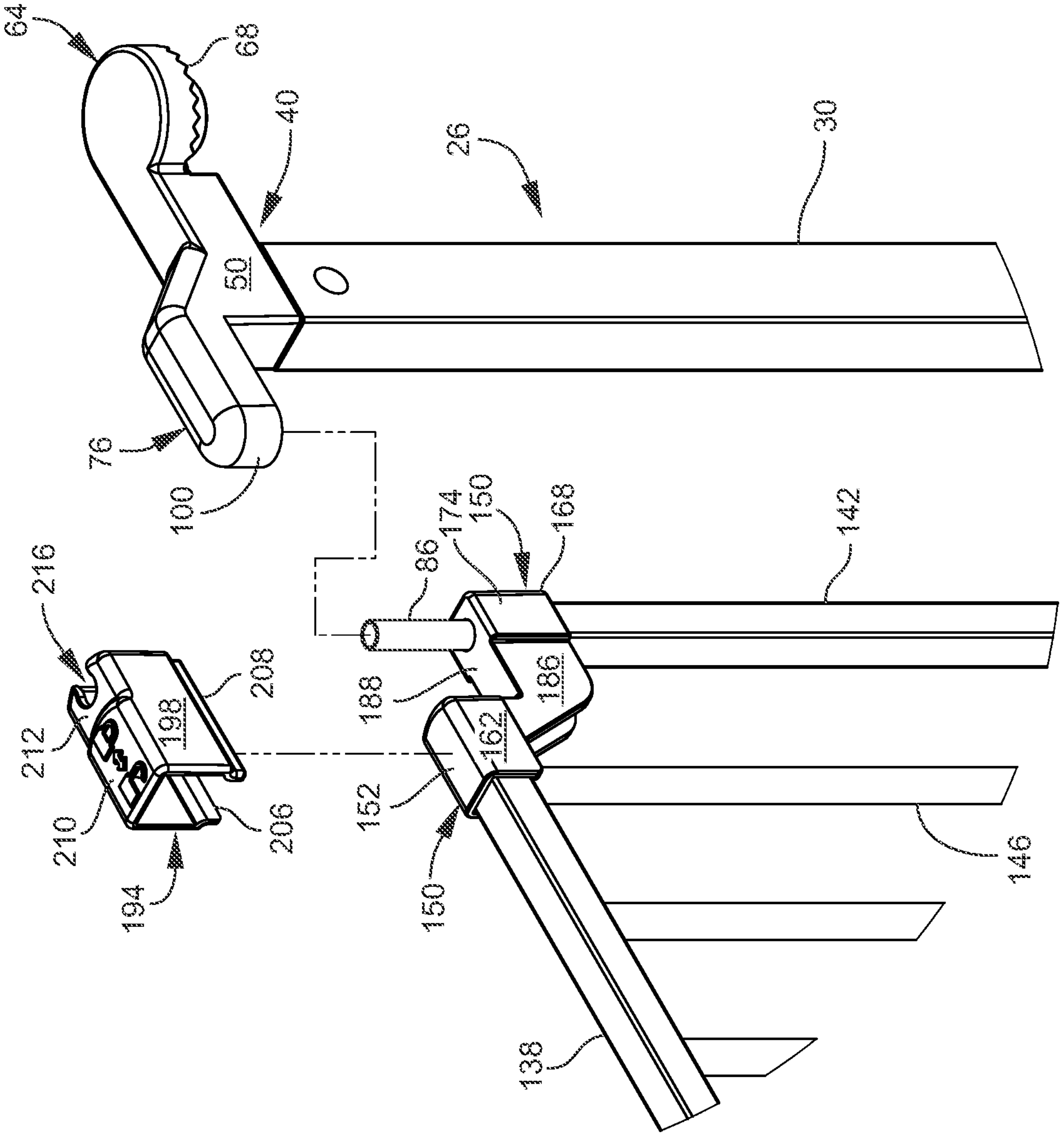
FIG. 6 is a perspective, partially disassembled view of the lift lock of FIG. 1.
Figure 7:
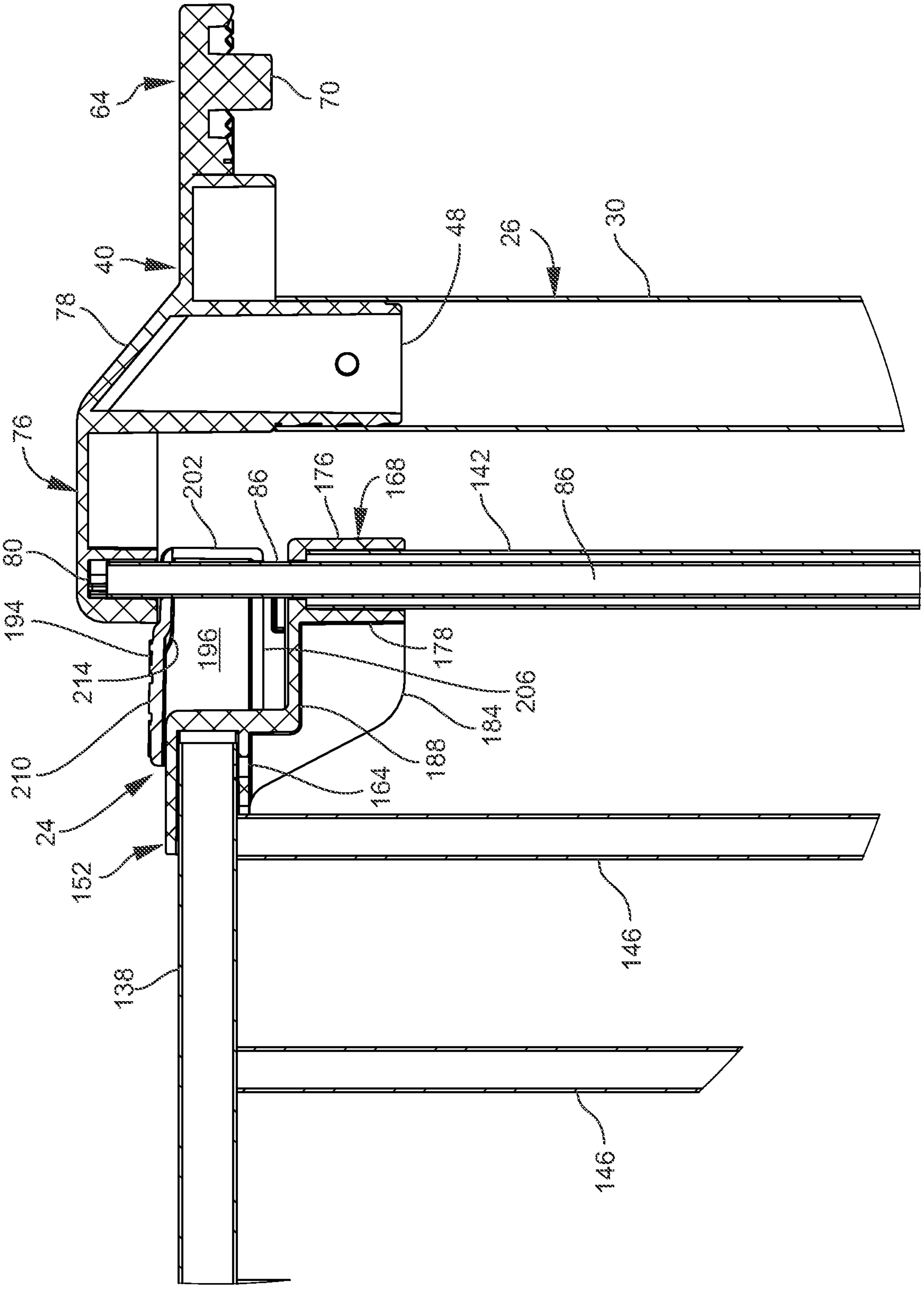
FIG. 7 is a section view of the lift lock of FIG. 1.
Figure 8A:
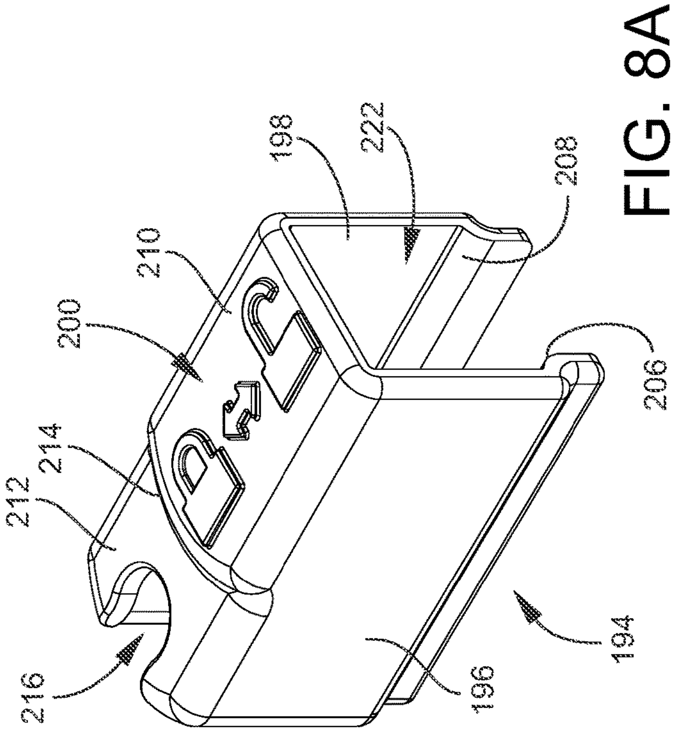
FIG. 8A is a perspective view of the slide of the lift lock of FIG. 1.
Figure 8D:
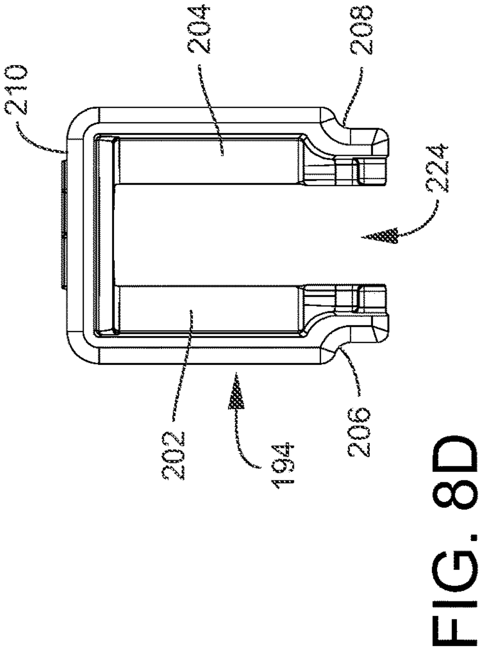
FIG. 8D is a distal or inner end view of the slide of the lift lock of FIG. 8A.
Figure 8B:
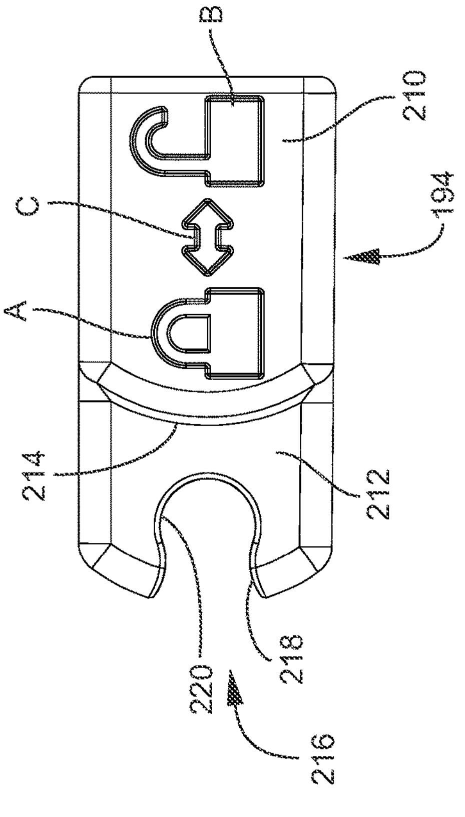
FIG. 8B is a top view of the slide of the lift lock of FIG. 8A.
Figure 8C:
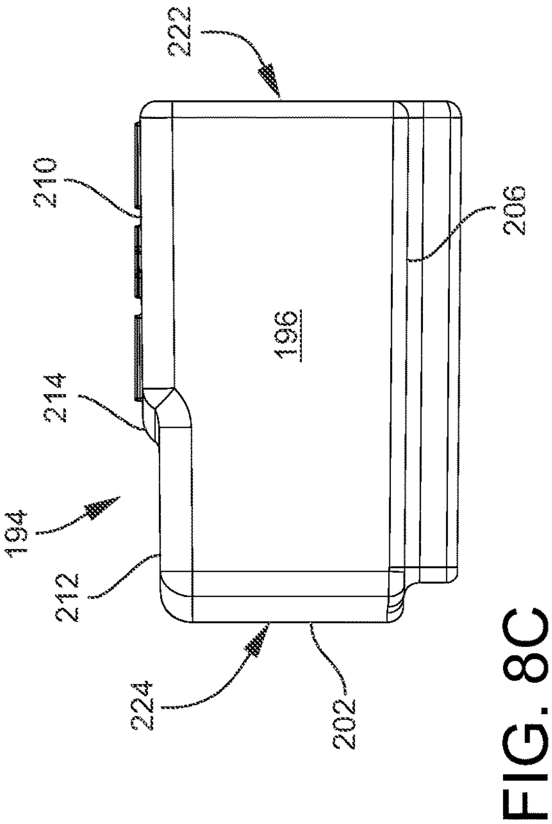
FIG. 8C is a side view of the slide of the lift lock of FIG. 8A.
Figure 9A:
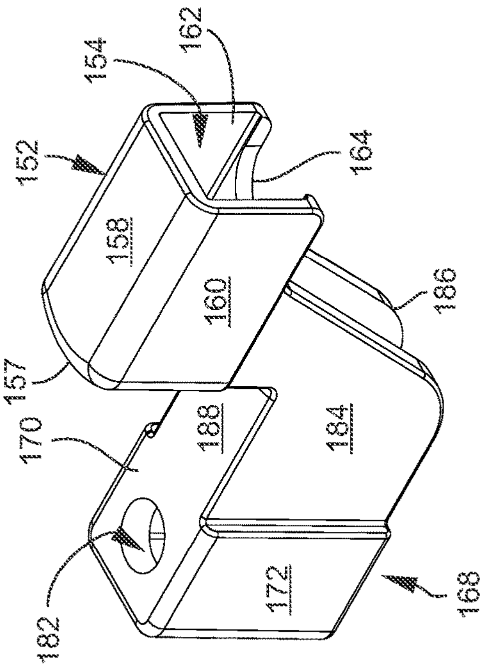
FIG. 9A is a perspective view of the corner piece that replaces the conventional corner connection of a gate frame and that extends from an upper gate frame member to an end gate frame member of the gate of FIG. 1.
Figure 9D:
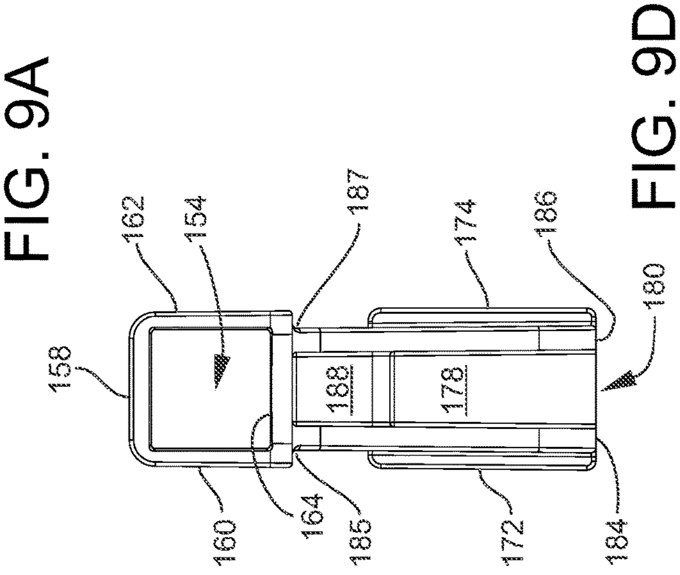
FIG. 9D is a distal or inner end view of the corner piece of FIG. 9A.
Figure 9B:
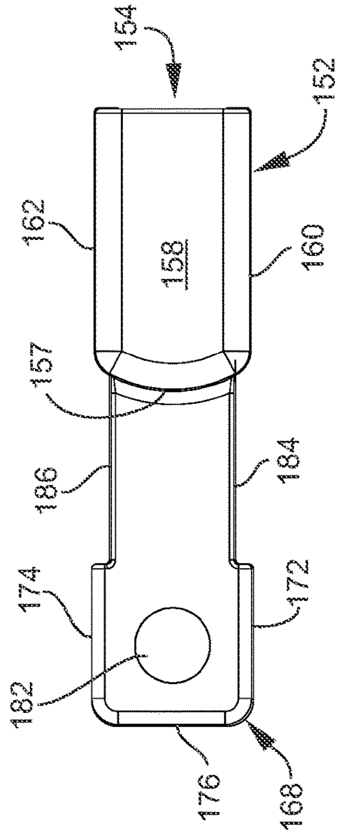
FIG. 9B is a top view of the corner piece of FIG. 9A.
Figure 9C:
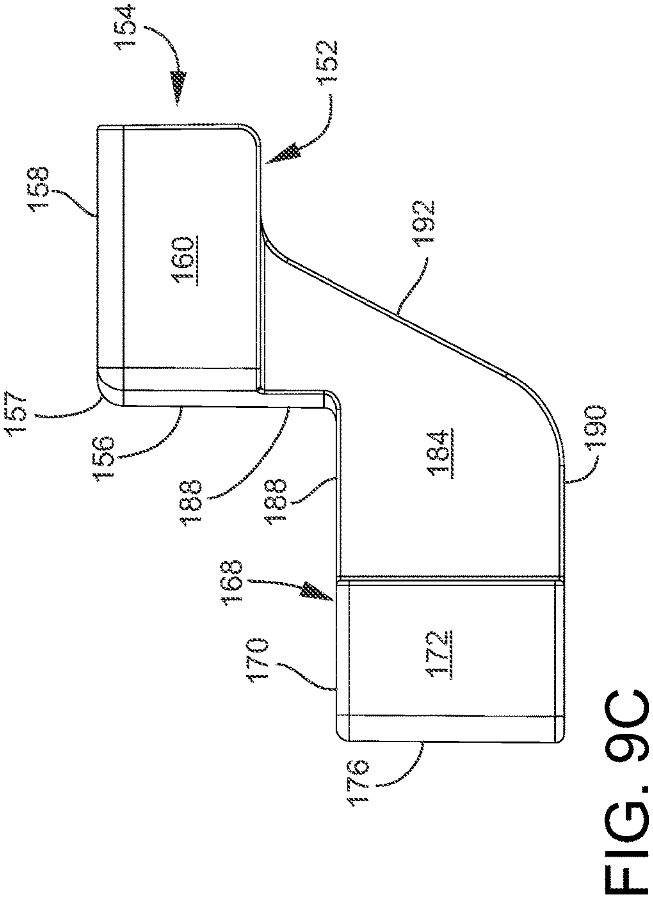
FIG. 9C is a side view of the corner piece of FIG. 9A.
Figure 10C:
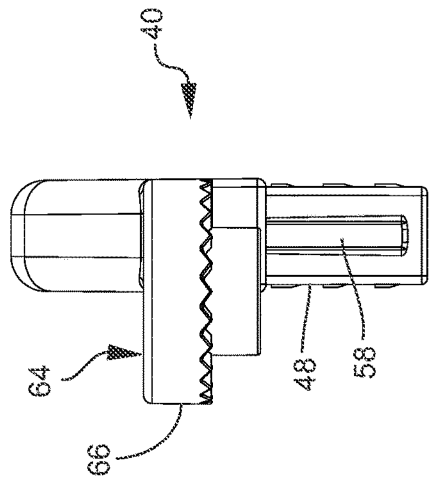
FIG. 10C is an outer end view of the upper end frame portion of FIG. 10A.
Figure 10A:
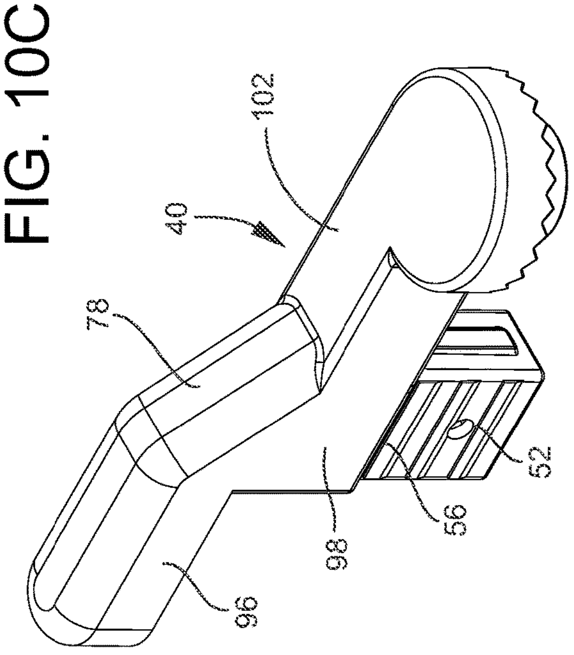
FIG. 10A is a perspective view of an upper end frame portion of the gated barrier of FIG. 1.
Figure 10B:
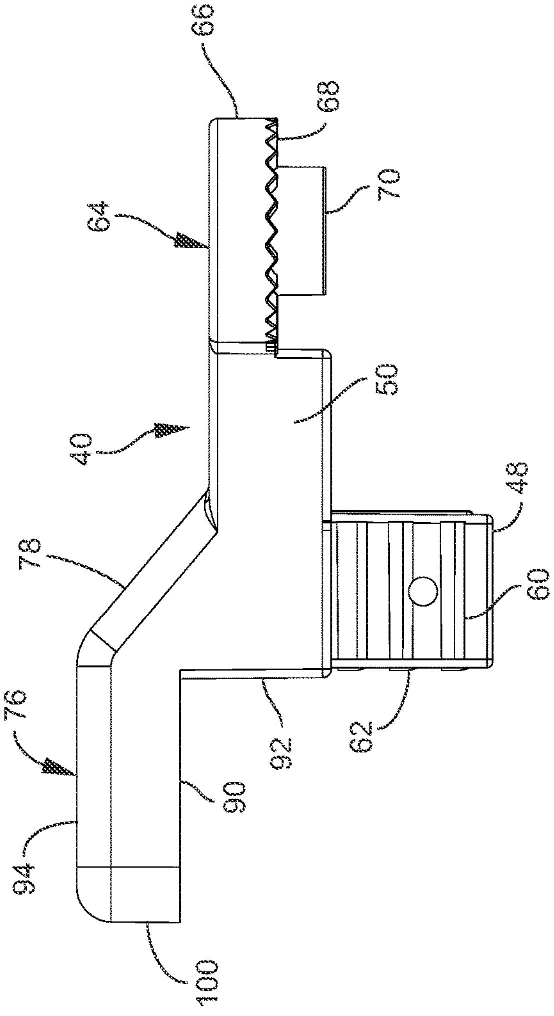
FIG. 10B is a side view of the upper end frame portion of FIG. 10A.
Figure 10D:
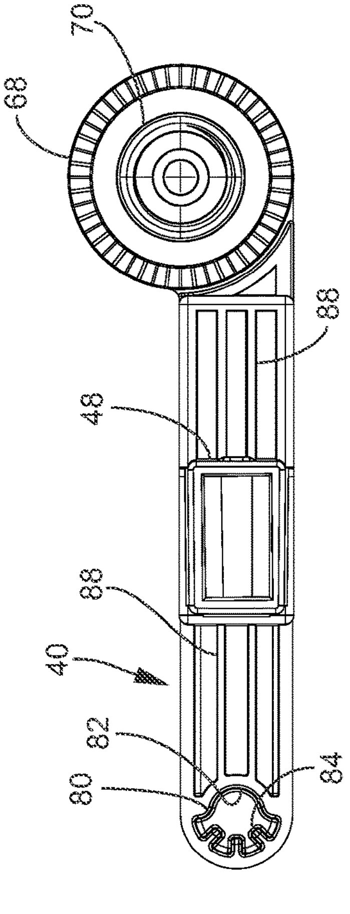
FIG. 10D is a bottom view of the upper end frame portion of FIG. 10A.

Upper end portion 40 includes a connection 76 extending inwardly from the body 50. Connection 76 is disposed at a greater elevation than connection 64. Body 50 includes an oblique edge 78 that provides height to the body 50. Connection 76 includes a pivot receptor 80. Pivot receptor 80 includes a curved edge 82. Opposing the curved edge 82 are a set of three tabs 84. Pivot receptor 80 receives pivot or tube 86 shown in FIG. 6. Tabs 84 are resilient and flex slightly when pivot 86 is captured by a friction fit between curved edge 82 and the distal ends of the three tabs 84. The distal ends of the tabs 84 and curved edge 82 define a circle that has a diameter equal to or slightly less than a diameter of pivot 86. Pivot 86 is a tube that runs from the upper end portion 40 to lowermost frame member portion 34, where the lower end of pivot 86 engages an opening in the top of the lowermost frame member portion 34.

Upper end portion 40 includes a set of two internal, spaced apart, parallel, vertically extending, and transversely extending ribs 88 that extend from connection 76, through body 50 and into connection 64 to maximize the rigidity of upper end portion 40.

Connection 76 includes a lower horizontal edge 90 that is set at a right angle to a vertical inner edge 92 of body 50. Connection 76 includes an upper edge 94 that is parallel to lower horizontal edge 90. Connection 76 includes a front face 96 that is coplanar with a front face 98 of body 50. Connection 76 includes a rear face opposite and parallel to front face 96 and body 50 includes a rear face opposite and parallel to front face 98, with such rear faces being coplanar.

Connection 76 includes an inner end edge 100 that curves or tapers up to the upper edge 94. Front face 96 and its opposing rear face curves or tapers up to upper edge 94. Front face 98 and its opposing rear face curve or taper to the oblique edge 78 of base 50. Front face 96 leads into front face 98, and their respective opposing faces lead into each other.

Body 50 includes an upper face 102 that is flat and coplanar with an upper face of disk shaped portion 66. Oblique edge 78 rises from upper face 102 to upper edge 94.

The lower edge 90 of connection 76 runs parallel to upper face 102 of base 50. The lower edge 90 is disposed at a greater altitude than upper face 102 and the upper face of disk shaped portion 66.

Upper end frame portion 42 is disposed opposite of upper end frame portion 40. Upper end frame portion 42 includes body 50, connection 76, and base 48.

Upper end frame portion 42 includes an outwardly extending upper connection 104 that is disk shaped. An upper face of the upper connection 104 includes a set of annular arranged teeth 106. Upper connection 104 and lower base connector 46 engage a structure such as fencing therebetween. Lower base connector 46 includes a disk 108 and a cylinder 110 that engage such structure such as fencing.

Lower base connector 44 includes an integral plug portion that engages a tubular open end of lower frame end portion 34. Lower base connector 46 includes an integral plug portion that engages a tubular open end of lower frame end portion 36.

Gate 16 includes an uppermost horizontally extending frame member 112, a lowermost horizontally extending frame member 114, an outer end vertically extending frame member 116, and an inner end vertically extending frame member 118. A set of eight vertically extending inside frame members 120 extend to and between the uppermost and lowermost horizontally extending frame members 112, 114. Frame members 120 are spaced apart equidistantly from each other. That is, any two immediately adjacent frame members 120 are spaced apart by the same distance as any other two immediately adjacent frame members 120. Frame members 116, 118, 120 are tubular. When gate 16 is closed, gate 16 is in a common plane with U-shaped barrier frame 12. Gate 16 is in a common plane with gate 14 when gates 14 and 16 are closed. Gate 16 defines a plane. Gate 14 defines a plane.

Gate 16 includes its respective pivot or tube 86 that extends from pivot receptor 80 in connection 76, through vertical frame member 116, to an opening in the top side of lowermost frame member 36, and into the tubular lowermost frame member 36. Gate 16 swings on the axis defined by pivot 86. Gate 16 swings forwardly and rearwardly until the gate 16 makes contact with end frame portion 28.

Gate 16 includes all portions of latch apparatus 18 except for a latch receiver 122 that is disposed on gate 14. Latch apparatus 18 includes a body 124. Body 124 engages upper frame member 112, the innermost vertical frame member 120, and inner end vertical member 118. Latch apparatus 18 includes a button 126 that, when depressed, retracts a latch 128 from the latch receiver 122. When button 126 is released, latch 128 automatically extends from latch body 124 so as to engage latch receiver 122. Latch apparatus 18 is engaged to gate 16 at the top inner corner portion of gate 16.

As shown in FIGS. 1, 2, 3, 4, 15A, 15B, and 15C, a connector apparatus or lower latch apparatus 20 is engaged to gate 16 at the bottom inner corner portion of gate 16. Connector apparatus 20 includes an inverted T-shaped plastic piece 132 that is engaged to the bottom end of vertical frame member 118 and that is further engaged to the inner end of lowermost horizontal frame member 114. Bottom end of vertical frame member 118 and inner end of lowermost horizontal frame member 114 may or may not be engaged to each other within the inverted T-shaped plastic piece 132. If such ends are not engaged to each other, such ends are adjacent to and spaced from each other, where such ends refer to the bottom end of vertical frame member 118 and the inner end of lowermost horizontal frame member 114 of gate 16. Inverted T-shaped piece 132 has three ends. A first end receives and engages the bottom end of vertical frame member 118. A second end receives and engages the inner end of lowermost horizontal frame member 114. A third end extends in a straight line from such second end and extends beyond the inner reach of vertical frame member 118 and toward gate 14. This third end includes a pivot 134 and a front pivoting arm 136. A rear pivoting arm 136 is engaged to the pivot 134 on the rear side of the inverted T-shaped piece 132. Front and rear pivoting arms 136 and pivot 134 may pivot as one piece. That is, when front pivoting arm 136 is pivoted, the pivot 134 and rear pivot arm 136 follow such action simultaneously and also pivot. Likewise, when rear pivot arm 136 is turned, pivot 134 and front pivot arm 136 are also simultaneously and immediately turned. Each of front and rear arms 136 is friction fit with the front and rear sides of the T-shaped piece 132 such that each of the front and rear arms 136 can be locked in a horizontal out-of-the-way position, that is out of the way from gate 14.

Figure 15A:
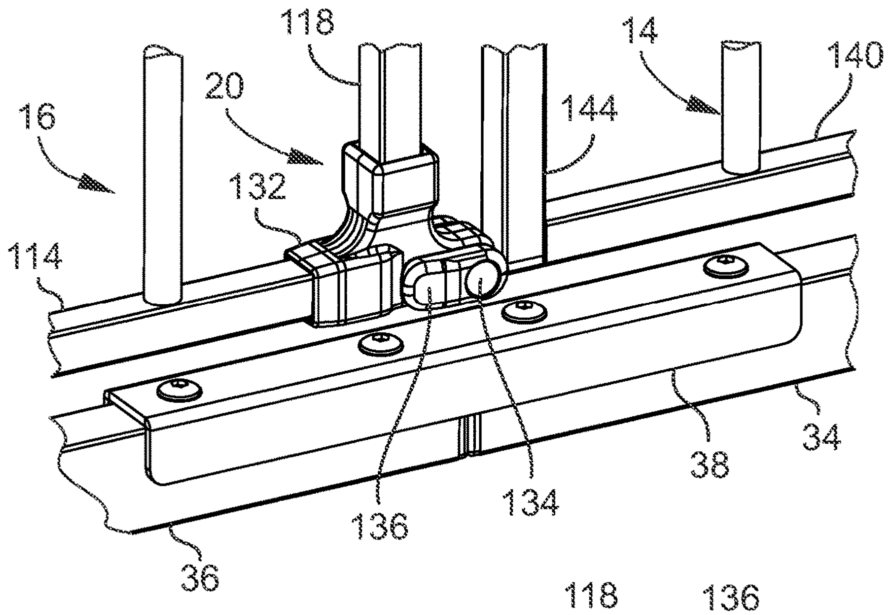
FIG. 15A is a detail view of a portion of FIG. 1, where such portion includes a lock between the first and second gates.
Figure 15B:
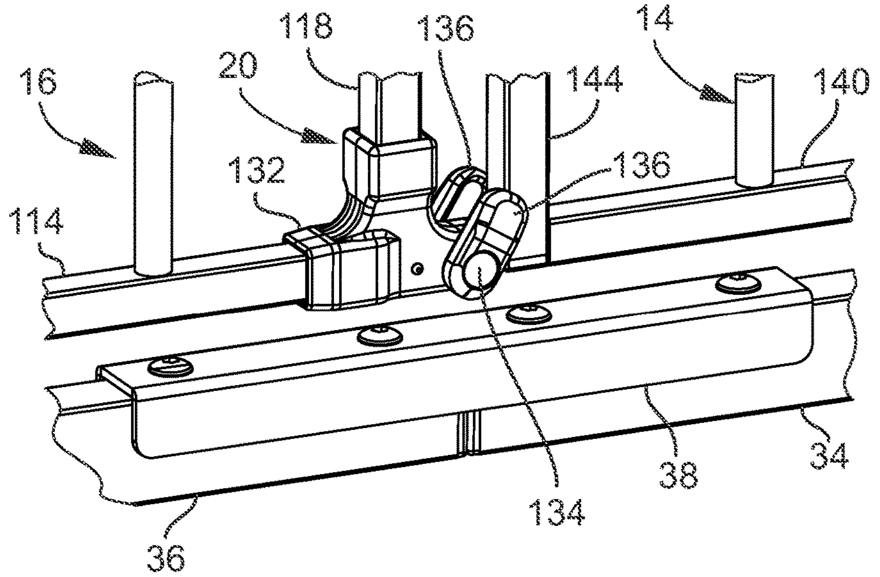
FIG. 15B is a view similar to FIG. 15A, and shows the lock beginning to swing from one gate to the other gate.
Figure 15C:
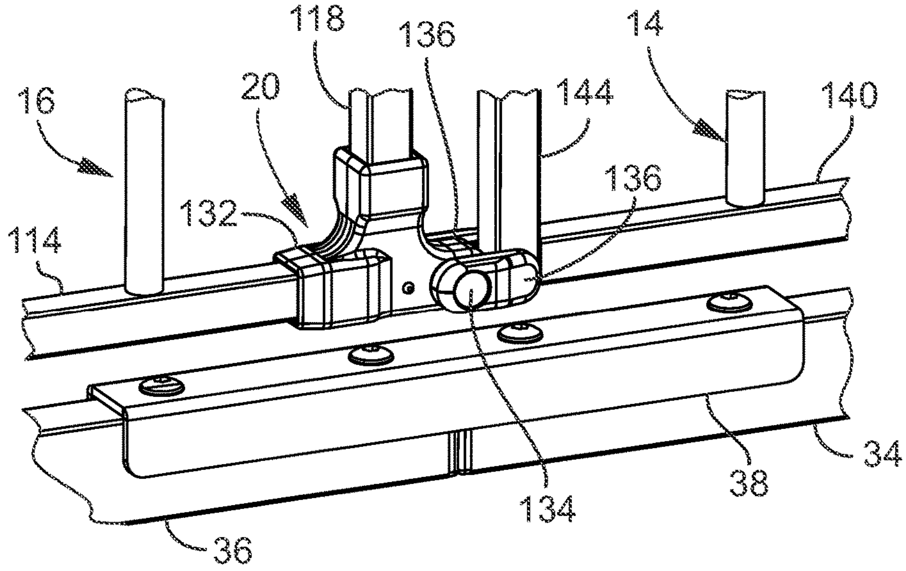
FIG. 15C is a view similar to FIG. 15A, and shows the lock having been fully swung to the other gate.

As shown in FIGS. 15B and 15C, each of the front and rear pivot arms 136 can be turned horizontally inwardly to extend horizontally to engage front and rear sides of gate 14 such that a swinging of gate 16 is minimized by an engagement of the lower inside corner portions of gates 14, 16 with each other. FIG. 15B shows the pivot arms 136 in the process of being swung from the position shown in FIG. 15A to the position shown in FIG. 15C. FIG. 15C shows the preferred engagement of the pivot arms 136 with gate 14. If front and rear pivot arms 136 are one piece or are independent of each other, both arms 136 may be turned to a horizontal location to engage gate 14. If front and rear pivot arms 136 are independent of each other, one or both arms 136 may be pivoted to a horizontal location to engage a respective side of gate 14 such that only one direction of swing (i.e., only one forward or rear direction of swing) may be controlled where only one of the front and rear pivot arms 136 is turned 180 degrees to confront the respective front or rear side of gate 14. Arms 136 may be fixed at such an operating horizontal location, where such arms 136 engage gate 14, by a friction fit with T-shaped piece 132 or by a friction fit with gate 14. If arms 136 are turned downwardly and vertically, such as inadvertently turned downwardly and vertically, the arms 136 are sufficiently short to clear the top side of inverted U-shaped piece 38 such that gate 16 can swing both forwardly and rearwardly when the arms 136 are turned downwardly and vertically.

Each of the front and rear pivot arms 136 may, if desired, be lengthened to be of sufficient length to extend beyond the top side of inverted U-shaped piece 38 a sufficient distance to cover a portion of the front and rear sides of the inverted U-shaped piece 38 so as to minimize front and back swinging of gate 16 when the front and rear pivot arms 136 are turned down and vertically. If desired, front and rear pivot arms 136 and pivot 134 may be manufactured such that front and rear pivot arms 136 pivot independent of the other pivot arm 136 such that instead of regulating both forward and rear swinging of gate 16, only one direction of swing (i.e., only one forward or rear direction of swing) may be controlled where only one of the front and rear pivot arms 136 is turned down to confront the respective front or rear side of inverted U-shaped piece 38. Each of front and rear arms 136 is friction fit with the front and rear sides of the T-shaped piece 132 such that each of the front and rear arms 136 can be locked in a horizontal out-of-the-way position from inverted U-shaped piece 38.

Gate 14 includes an uppermost horizontally or transversely extending frame member 138, a lowermost horizontally extending or transversely extending frame member 140, an outermost or proximal vertically extending end frame member 142, and an innermost or distal vertically extending end frame member 144. Gate 14 further includes a set of eight vertically extending inside frame members 146 disposed between vertical end frame members 142, 144. Vertical frame members 146 are disposed equidistance from each other such that two immediately adjacent vertical frame members 146 are set the same distance apart as any other two immediately adjacent vertical frame members 146. Frame members 138, 140, 142, 144, 146 are tubular. When gate 14 is closed, gate 14 is in a common plane with U-shaped barrier frame 12.

Gate 14 includes its respective pivot or tube 86 that extends from pivot receptor 80 in connection 76, through vertical frame member 142, to an opening in the top side of lowermost frame member 34, and into the tubular lowermost frame member 34. Gate 14 swings on the axis defined by pivot 86. Gate 14 swings forwardly and rearwardly until the gate 14 makes contact with end frame portion 26.

Uppermost horizontal frame member 138 includes a tubular outer end that includes latch receptor 122 that receives latch 128 of latch apparatus 18.

Lowermost horizontal frame member 140 includes inverted U-shaped catch 22 that includes front and rear plates or plate sections 148. Front and rear plates 148 confront the front and rear sides of lowermost horizontal frame member 34 when gate 14 is in the down position. When gate 14 is lifted up, the bottom edges of front and rear plates 148 clear the top face of lowermost horizontal frame member 34 such that gate 14 can be swung to the front or to the rear of lowermost horizontal frame member 34. When gate 14 is in the down position and front and rear plates 148 confront the front and rear sides of the lowermost horizontal frame member 34, a swinging of gate 14 to each of the front or rear of lowermost horizontal frame member 34 is minimized. Inverted U-shaped catch 22 is engaged to lowermost horizontal frame member 140 and includes a width about equal to the width between two adjacent vertical frame members 146.

Gate 14 includes lift lock apparatus 24. Lift lock apparatus 24 includes a base or piece 150 extending downwardly from uppermost horizontal member 138 of gate 14 and inwardly from outermost end vertical member 142 of gate 14. The outer or proximal end of uppermost horizontal member 138 and the upper end of outermost or proximal end vertical member 142 terminate short of each other, are adjacent to each other, and are spaced from each other. The axis of uppermost horizontal member 138 intersects the axis of outermost or proximal end vertical member 142.

Base 150 includes an integral upper and horizontal receptor portion or slide mount 152 for receiving the outer end of uppermost horizontal member 138. Receptor portion 152 includes an open end 154 that receives the outer or proximal end of uppermost horizontal member 138. Base 150 includes a closed end 156 that is opposite of open end 154. Closed end 156 is curved. A horizontal section of closed end 156 defines a round segment having an axis. Base 150 further includes a top or ceiling 158 and a pair of opposing walls or sides 160, 162. Base 150 further includes a floor or bottom 164 having a cut-out 166 for receiving the vertical frame member 146 that is adjacent to outermost end frame member 142. When receptor portion 152 is slid onto the outer end of uppermost horizontal member 138, the edge of the floor 164 forming cut-out 166 stops such sliding. Closed end 156 may also stop such sliding. Receptor portion 152 receives with a friction fit the outer or proximal end of uppermost horizontal member 138. The transitions between the sides 160, 162 and the top 158 may be tapered or include a radius. The transitions between the sides 160, 162 and the closed end 156 may be tapered or include a radius. A transition 157 between the top 158 and the closed end 156 is tapered or includes a radius. A horizontal section of transition 157 defines a curved or round segment having an axis. The transition between side 160 and floor 164 is a right angle and the transition between side 162 is a right angle.

Base 150 includes an integral lower and vertical receptor portion 168 for receiving the upper end of the outermost or proximal end vertical frame member 142 with a friction fit. Receptor portion 168 includes a top 170, a rear side 172, a front side 174, an outer end wall 176, an inner end wall 178, and an open bottom 180. Top 170 is opposite to the open bottom 180. When the upper end of the outermost or proximal end vertical frame member 142 is pushed or slid into the receptor portion 168, such upper end is pushed into the open bottom 180 and such sliding is stopped by the top 170. Top 170 includes an opening 283 for pivot 86. Sides 172, 174, and end wall 176 taper into top 170. Sides 172, 174 taper into outer end wall 176. Sides 172, 174 taper into inner end wall 176.

A pair of integral vertical plate sections 184, 186 join the upper and lower receptor portions 152, 168. Plate sections 184, 186 define respective parallel planes. Plate section 184 is a rear plate section and plate section 186 is a front plate section. Rear plate section 184 is inset inwardly from rear side 172. Front plate section 186 is inset inwardly from front side 174. Plate sections 184, 186 extend inwardly from the inner end wall 178 and join up integrally with the bottom or floor 164 of receptor portion 152. Rear plate section 184 is inset inwardly from rear side 160 of receptor portion 152. Front plate section 186 is inset inwardly from front side 162 of receptor portion 152. Such insets expose longitudinal sections of floor 164 and form a first right angled track 185 between plate section 184 and floor 164 and a second right angled track 187 between plate section 186 and floor 164. Tracks 185, 187 run the longitudinal length of sides 160, 162, respectively.

An integral L-shaped piece 188 joins plate sections 184, 186. Integral L-shaped piece 188 runs from the top 170 of receptor portion 168 to the closed end 156 of receptor portion 152. A horizontal section of L-shaped piece 188 defines a plane with top 170 of receptor portion 168. A vertical section of L-shaped piece 188 takes on the round shape of and shares an axis with closed end 156. Plate section 184 connects to end wall 178, the horizontal section of L-shaped piece 188, the vertical section of L-shaped piece 188, closed end 156, and floor 164. Plate section 186 connects to end wall 178, the horizontal section of L-shaped piece 188, the vertical section of L-shaped piece 188, closed end 156, and floor 164. Each of the plate sections 186 includes a lower straight horizontal edge 190 that tapers into a straight oblique edge 192 running inwardly and upwardly that tapers into the floor 164 of the receptor portion 152.

Lift lock apparatus 24 includes a slide 194 that engages upper receptor portion or slide mount 152. Slide 194 includes a rear side 196, a front side 198, a two level top 200, a first end wall 202, and a second end wall 204. Slide 194 further includes a rear inset floor portion or rear runner 206 and a front inset floor portion or front runner 208. Rear runner 206 runs longitudinally the length of the rear side 196 and is inset inwardly from the rear side 196. Front runner 208 runs longitudinally the length of the front side 198 and is inset inwardly from the front side 198. Rear runner 206 engages track 185 of the slide mount 152. Front runner 208 engages track 197 of the slide mount 152. The inside face of rear wall 196 of slide 194 abuts and slides against the outside face of rear wall 160 of slide mount 152. The inside face of front wall 198 of slide 194 abuts and slides against the outside face of front wall 162 of slide mount 152.

Top 200 of slide 194 includes two levels. Ceiling portion 210 is disposed at a higher level than ceiling portion 212. Ceiling portion 210 tapers downwardly into ceiling portion 212 through a transition 214. A horizontal section of transition 214 defines a curved or round segment having an axis. The inner surface of transition 214 is a stop that abuts against the outside surface of transition 157 of slide mount 152 to define the innermost limit of an inwardly sliding of slide 194, i.e., in the direction toward gate 16 when gate 16 is in the closed position. The outer surface of ceiling portion 210 includes indicia molded thereon in raised fashion showing which direction slide 194 is slid to unlock the lift lock apparatus 24 and thus permit gate 14 to be lifted and which direction slide 194 is slid to lock the lift lock apparatus 24 and thus lock the gate 14 against being lifted. Shape A represents a closed lock. Shape B represents an open lock. Shape C is a double arrow showing the direction of sliding. Gate 14 is prevented from being lifted when the slide 194 is slid to the closed direction in the direction of shape A. Gate 14 is liftable when slide 194 is slid to the open position in the direction of shape B, provided latch apparatus 18 is open.

Lower ceiling portion 212 includes a snap cut-out 216 for snappingly receiving therein pivot 86. Cut-out 216 includes a resilient neck 218 having a width slightly less than the diameter of pivot 86 and a circular opening 220 having a diameter about the diameter of pivot 86. From the resilient neck 218 outwardly, snap cut-out 216 is flared or widened or tapered to form a guide to better draw in pivot tube 86 to the neck 218 and circular opening 220. From the resilient neck 218 inwardly, snap cut-out 216 is flared and starts to form the circular opening 220.

End walls 202, 204 extend inwardly from sides 196, 198, respectively, and provide integral support to the lower ceiling portion 212 at about the location where cut-out 216 is formed.

Slide 194 includes an inner end opening 222 formed by vertical inner edges of sides 196, 198 and horizontal inner edge of upper ceiling portion 210. Slide 194 includes an outer end opening 224 formed by the vertical inner edges of end walls 202, 204.

Slide 194 is resilient and snaps in place over the slide mount 152. Side walls 196, 198 are resiliently expandable relative to each other. Slide 194 is in the nature of a resilient clip with rails or runners 206, 208 that are resiliently seated into respective tracks 185, 187.

When slide 194 is in the locked position where the snap cu-out 216 has engaged pivot tube 86, the lower ceiling portion 212 of slide 194 is adjacent to or confronts the lower edge 90 of upper end frame portion 40. If an attempt is made to lift gate 14, the upper end of outermost or proximal end frame member 142 places pressure on top 170 of piece 150, which pressure is transmitted through piece 150 to the ceiling portions 212, 210 of the slide 194, which pressure is transmitted to the lower edge 90 of upper frame end portion 40. Even under such pressure, slide 194 may be manually slid to the unlocked out-of-the-way position. The slide 194 is then held at the unlocked position by a friction fit between inside surfaces of the slide 194 and exterior surfaces of the slide mount 152.

Figure 5B:
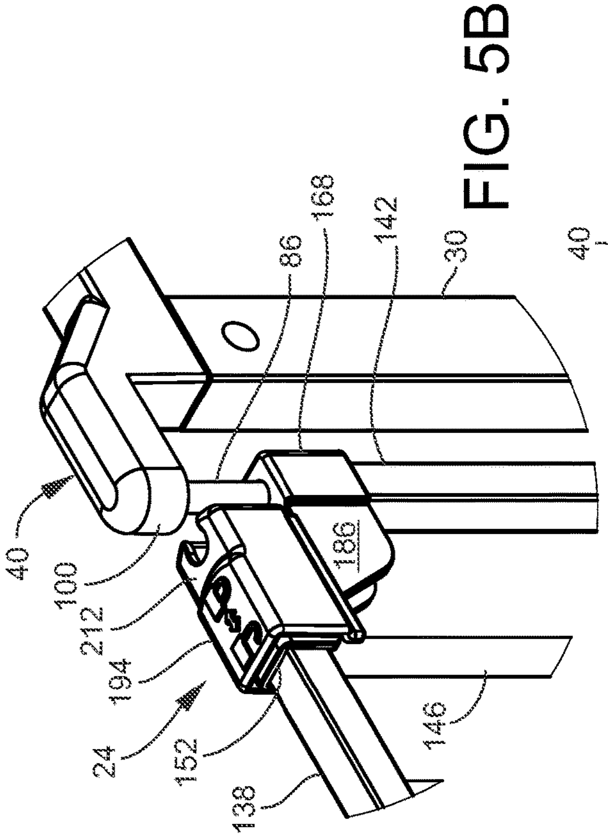
FIG. 5B is a perspective view of the lift lock of FIG. 2 where the lift lock is in the second, unlocked, and out-of-the-way position.
Figure 5D:
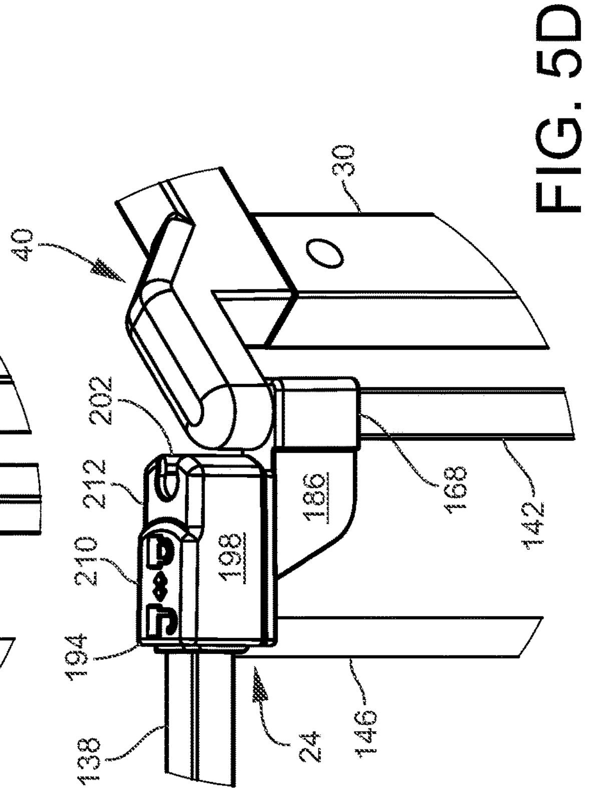
FIG. 5D is a perspective view of the lift lock of FIG. 4 where the lift lock is in the second, unlocked, and out-of-the-way position, and the right hand gate that has been lifted has been swung to an open position.
Figure 5A:
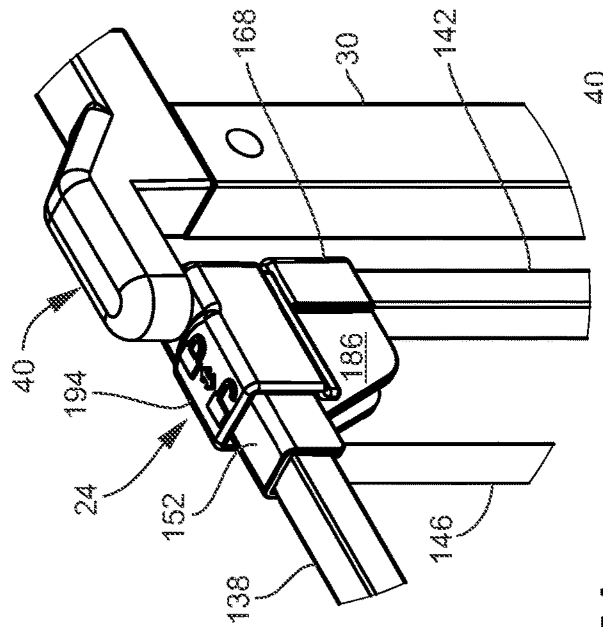
FIG. 5A is a perspective view of the lift lock of FIG. 1, where the lift lock is in the first and locked position.

As shown in FIG. 1, gates 14 and 16 are closed. The slide 194 of the lift lock apparatus 24 is in the locked or closed position. Latch apparatus 18 is in the latched position such that gates 14, 16 are engaged at the upper and inner corner positions. FIG. 1 shows front and rear arms 136 in the unengaged and out-of-the-way horizontal position. However, if desired, one or more of the front and rear arms 136 may abut vertical inner member 144 of gate 14. Further, if desired, where arms 136 are selected so as to be of a greater length, one or more of the front and rear arms 136 may abut inverted U-shaped piece 38. Still further, inverted U-shaped catch 22 remains confronting the front and rear sides of lowermost horizontal frame member 34 of the barrier frame 12. The FIG. 1 position of the lift lock apparatus 24 is shown in detail in FIG. 5A.

Figure 2:
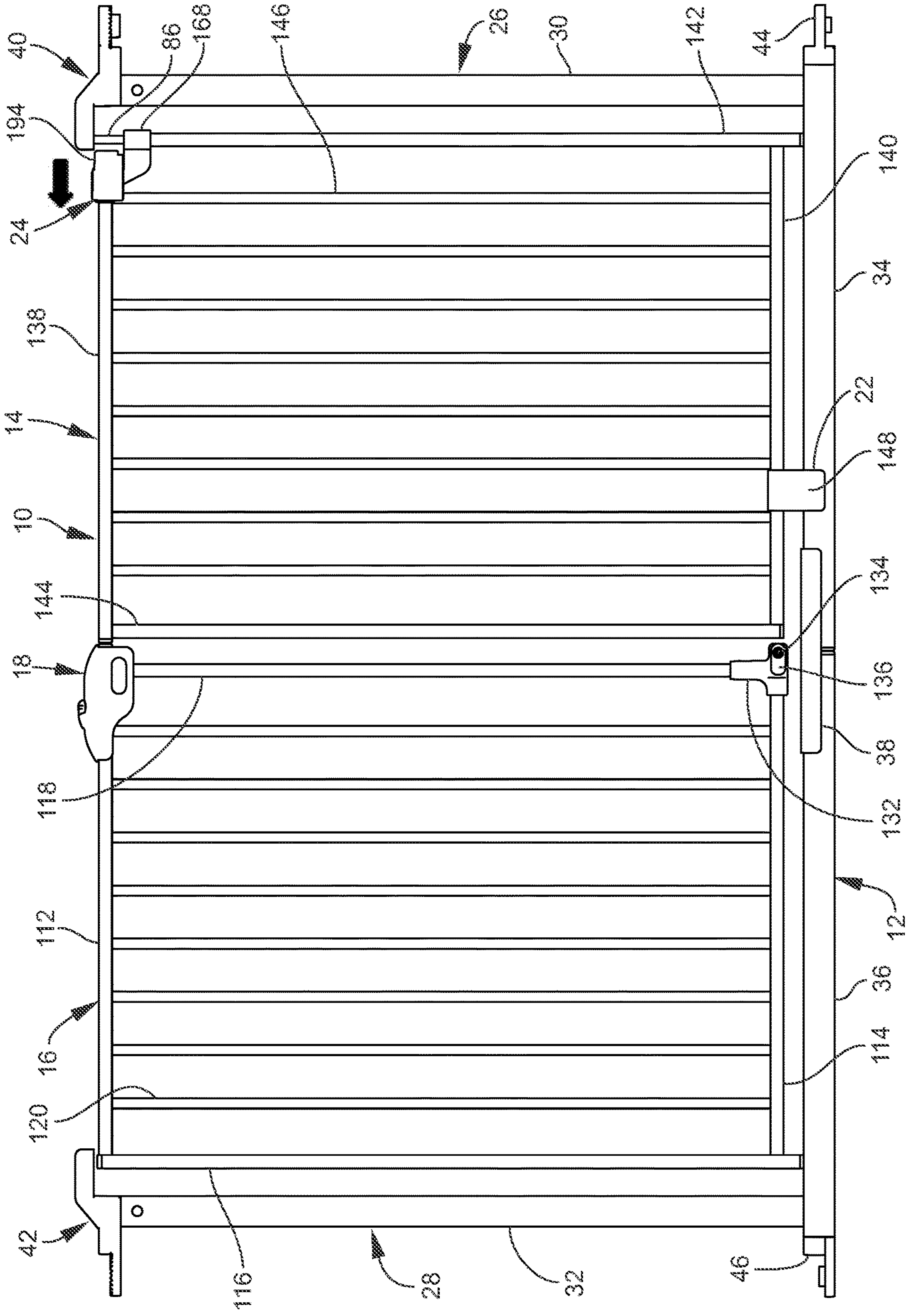
FIG. 2 is a front elevation view of the present gated barrier showing the lift lock in the upper right hand corner of the gate of the gated barrier, where the lift lock is in the second, unlocked, and out-of-the-way position and the right hand gate is closed, locked against swinging, and unlatched to the left hand gate.

FIG. 2 shows that the slide 194 of the lift lock apparatus 24 has been slid to the open position where the inner surface of transition or stop 241 of the slide 194 abuts the transition or stop 157 of the slide mount or upper receptor portion 152. FIG. 2 shows that the button 126 of latch apparatus 18 has been depressed to retract latch 128 from latch receptor 122. FIG. 2 shows that the arms 136 remain in their retracted out-of-the-way positions. FIG. 2 shows that the inverted U-shaped catch 22 remains confronting the front and rear sides of lowermost horizontal frame member 34 of the barrier frame 12. In FIG. 2, the gate 14 is in position to be lifted. The FIG. 2 position of the lift lock apparatus 24 is shown in detail in FIG. 5B.

Figure 3:
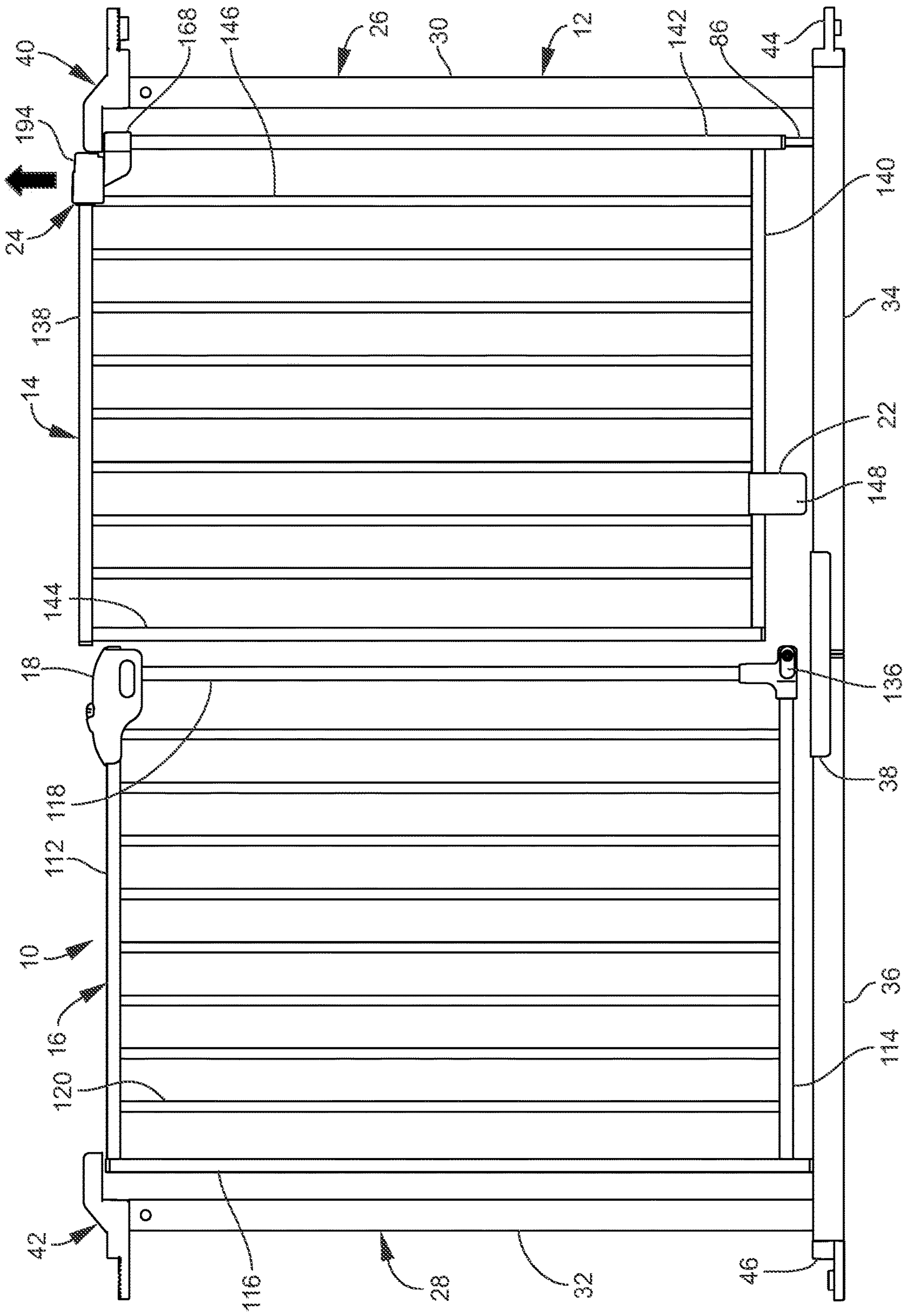
FIG. 3 is a front elevation view of the present gated barrier showing the lift lock in the upper right hand corner of the gate of the gated barrier, where the lift lock is in the second, unlocked, and out-of-the-way position, and the right hand gate has been lifted such that the inverted U-shaped catch has cleared the lowermost frame member of the barrier and the right hand gate is ready to be swung.
Figure 5C:
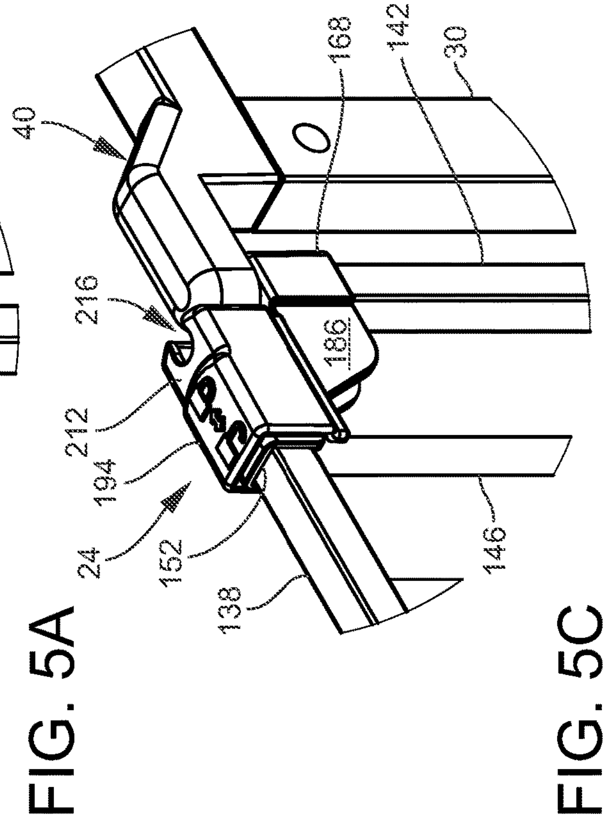
FIG. 5C is a perspective view of the lift lock of FIG. 3 where the lift lock is in the second, unlocked, and out-of-the-way position, and the right hand gate has been lifted.

FIG. 3 shows that gate 14 has been lifted. The lower receptor portion 168 now confronts or abuts the lower surface or edge 90 of the upper end frame portion 40. FIG. 3 shows that, with slide 194 having been slid to the unlocked and out-of-the-way position, slide 194 can attain an elevated position where the front end walls 202, 204 of the slide 194 are disposed opposite of and adjacent to innermost end edge 100 of the upper end frame portion 40. FIG. 3 shows that the arms 136 remain in their retracted out-of-the-way positions. FIG. 3 shows that the lower edges of the plates 148 of the inverted U-shaped catch 22 have cleared the top face of the lowermost horizontal support member 34 of the barrier frame 12. FIG. 3 shows that the lower end of the outermost end vertical support member 142 of the gate 14 is now spaced from the top of lowermost horizontal frame member 34 such that pivot tube 86 is exposed to the naked eye. FIG. 3 shows that the gate 14 is ready to be swung from a closed position to an open position. The FIG. 3 position of the lift lock apparatus 24 is shown in detail in FIG. 5C.

Figure 4:
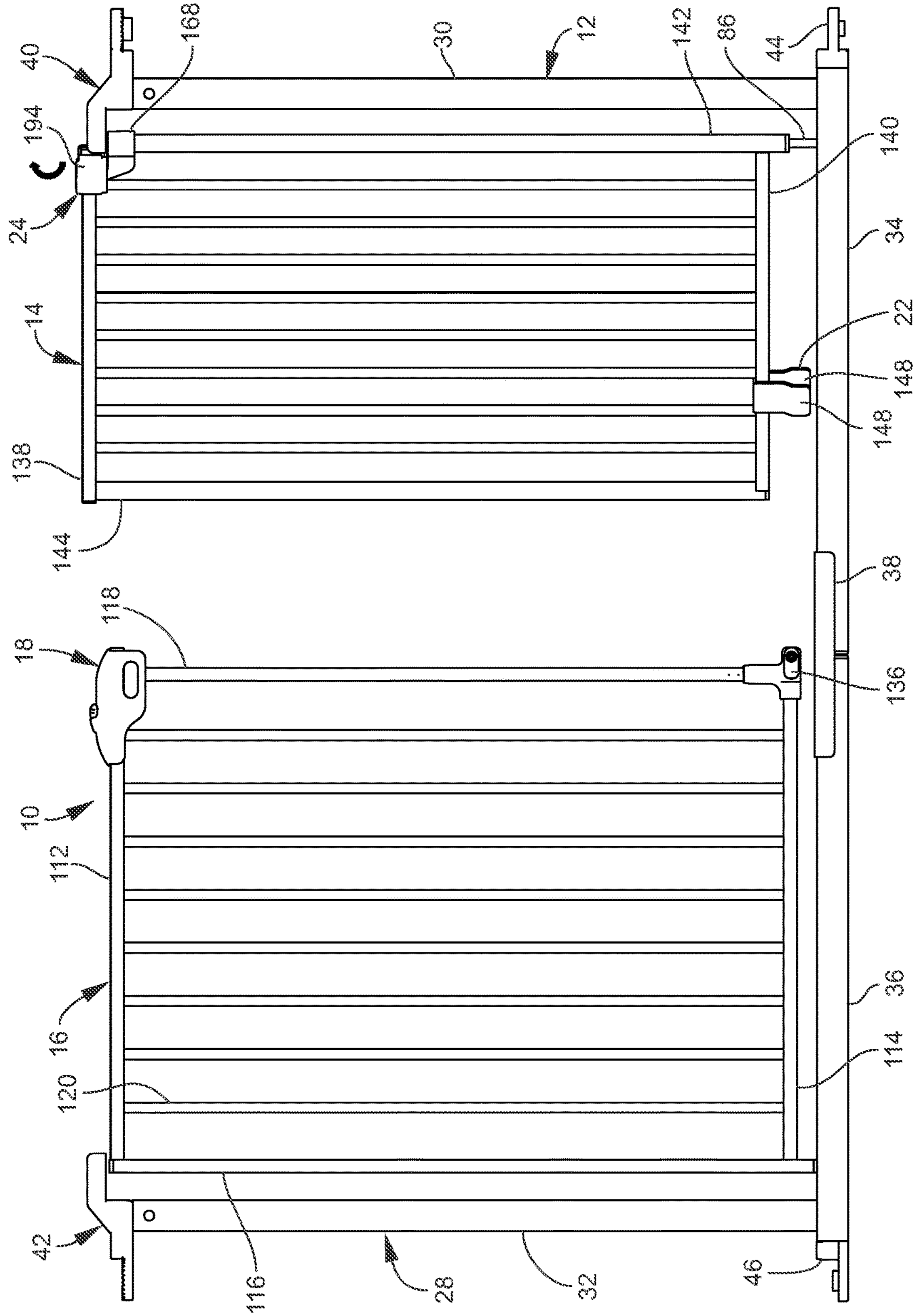
FIG. 4 is a front elevation view of the present gated barrier showing the lift lock in the upper right hand corner of the gate of the gated barrier, where the lift lock is in the second, unlocked, and out-of-the-way position, and the right hand gate that has been lifted has been swung to an open position.

FIG. 4 shows a lifted and open gate 14. Since gate 14 has been lifted, the U-shaped catch 22 and its plates 148 can clear the top face of lowermost horizontal frame member 34 of barrier frame 12 and gate 14 can swing as a whole to either the front or rear of the barrier frame 12. FIG. 4 shows the gate 14 having been swung to the rear of the barrier frame 12. When gate 14 is swung, slide 194 pivots about the innermost end edge 100 of the upper end frame portion 40 and remains disposed opposite of and adjacent to the innermost end edge 100 of the upper end frame portion 40. FIG. 4 shows that the lower end of the outermost end vertical support member 142 of the gate 14 remains spaced from the top of lowermost horizontal frame member 34 such that pivot tube 86 remains exposed to the naked eye. FIG. 4 shows that the lower receptor portion 168 remains confronting and abutting the lower surface or edge 90 of the upper end frame portion 40 when the gate 14 is in the lifted and swung position. The FIG. 4 position of the lift lock apparatus 24 is shown in detail in FIG. 5D.

As to gate 16, in FIG. 1 gate 16 is locked against swinging by the latch 128 of the latch apparatus 18 being in the extended position and engaging latch receptor 122 of the gate 14. After button 126 is depressed to retract latch 128 from the latch receptor 122 of gate 14, gate 16 may be swung either forwardly or rearwardly of the lowermost horizontal frame member 36 provided that arms 136 engage neither gate 14 nor inverted U-shaped piece 38. FIGS. 2, 3, and 4 show the same position for gate 16 and gate 16 may be swung in the position shown in these FIGS. 2, 3, and 4.

In operation, slide 194 prevents the gate 14 from being lifted. Latch apparatus 126 also prevents the gate 14 from being lifted when latch 128 is engaged in latch receiver 122. If an attempt is made to lift gate 14 when slide 194 is in the locked position and engaged to pivot tube 86, the upper end of outermost vertical frame member 142 brings pressure to bear against receptor portion 168. Receptor portion 168 is one-piece with receptor portion or slide mount 152, so that such pressure is transmitted to upper ceiling portion 210, which pressure is transmitted to lower ceiling portion 212, which pressure is transmitted to the lower edge 90 of the upper end frame portion 40, such that gate 14 is not liftable. In other words, when an attempt is made to lift gate 14 when slide 194 is in the locked position, the upper end of outermost vertical frame member 142 brings pressure upon piece 150 upon which the slide 194 is mounted such that there is no vertical movement between the slide 194 and piece 150. Since slide 194 and piece 150 have no relative vertical movement, the lift lock apparatus 24 acts as a block between the outermost vertical frame member 142 and the upper end frame portion 40.

To open gate 14, slide 194 is slid from the locked position, where slide 194 is snapped to pivot tube 86, to the unlocked out-of-the-way position where slide 194 is spaced from pivot tube 86, where the outer end of slide 194 clears the inner end 100 of the upper end frame portion 40, and where the transition or stop 214 of slide 194 hits the transition or stop 157 of the slide mount 152. Then button 126 of the latch apparatus 18 is pressed to retract latch 128. Then, if arms 136 are engaged to frame 14, arms 136 are disengaged. The next step is to lift gate 14 so that the U-shaped catch 22 clears the lowermost horizontal frame member 34. Since slide 194 is in the out-of-the-way position, gate 14 can be lifted.

After gate 14 has been lifted a sufficient distance such that inverted U-shaped catch 22 clears the top of the lowermost horizontal frame member 34, gate 14 is swung either forwardly or rearwardly.

After gate 14 has been lifted and swung, gate 14 can be lowered such that the bottom end of outermost vertical frame member 142 can abut the top of lowermost frame member 34. In the swung out and lowered position, slide 194 can be slid back into the locked position if desired such that, even though gate 14 is not in a common plane with the barrier frame 12, gate 14 can still be placed in a nonliftable position where slide 194 is locked to pivot tube 86 so as to prevent the gate 14 from being lifted.

To return the gate 14 to the closed position where the gate 14 is in a common plane with the barrier frame 12, the slide 194 is slid to the unlocked position, then the gate 14 is lifted such that the inverted U-shaped piece 22 clears the top of the lowermost horizontal frame member 34, then the gate 14 is swung back to be in a common plane with the barrier frame 12, then the gate 14 is lowered such that the inverted U-shaped piece 22 captures the lowermost horizontal frame member 24, then slide 194 is slid back into the locked position if desired. During the swinging back of gate 14 to the common plane with the barrier frame 14, the latch 128 of the latch apparatus 18 automatically snaps back into engagement with the latch receptor 122.

Figure 11:
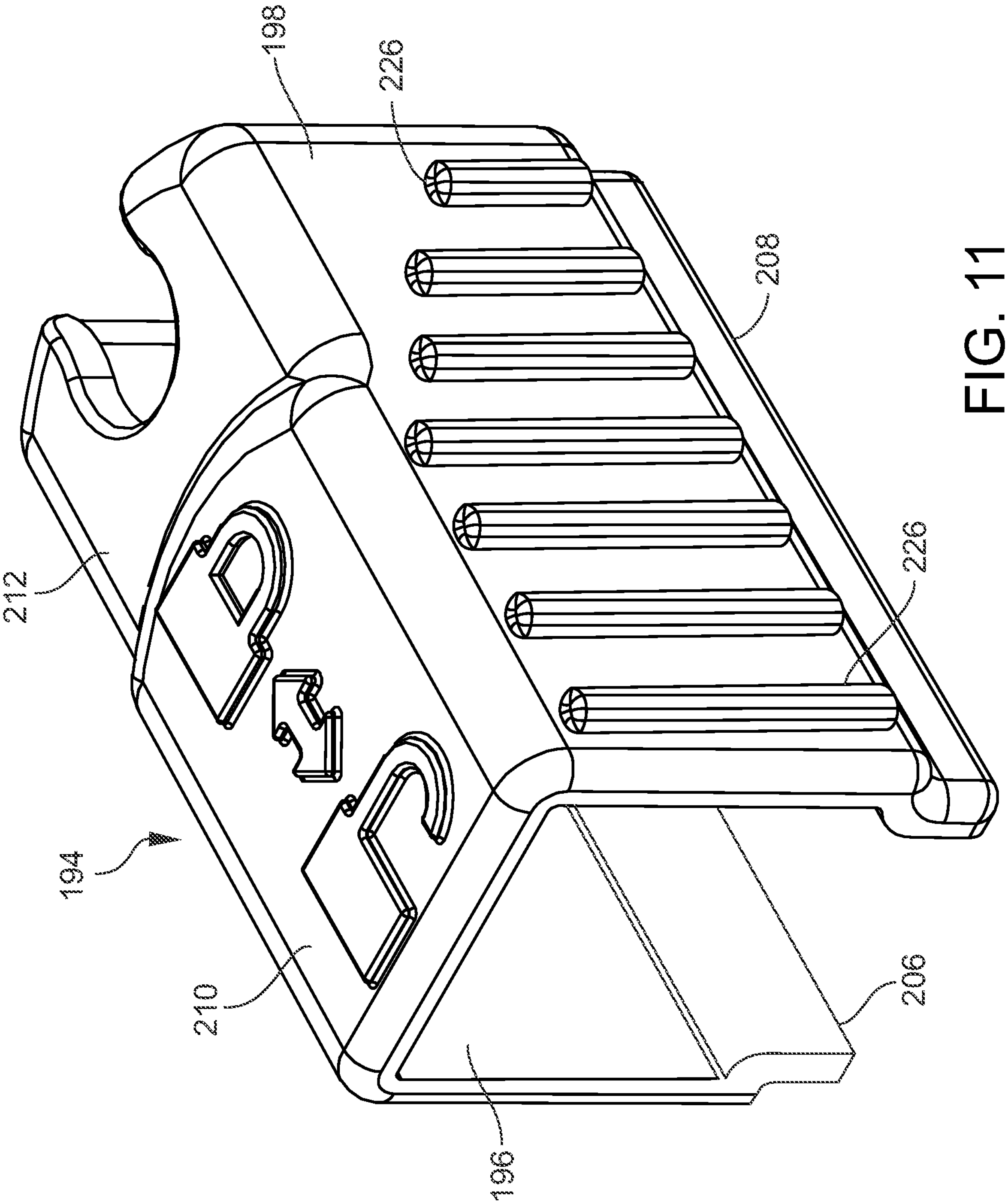
FIG. 11 is a perspective view of another embodiment of the slide of the lift lock of FIG. 1 where outer surfaces of the slide are roughened by the inclusion of ribs for a better manual grip.
Figure 12A:
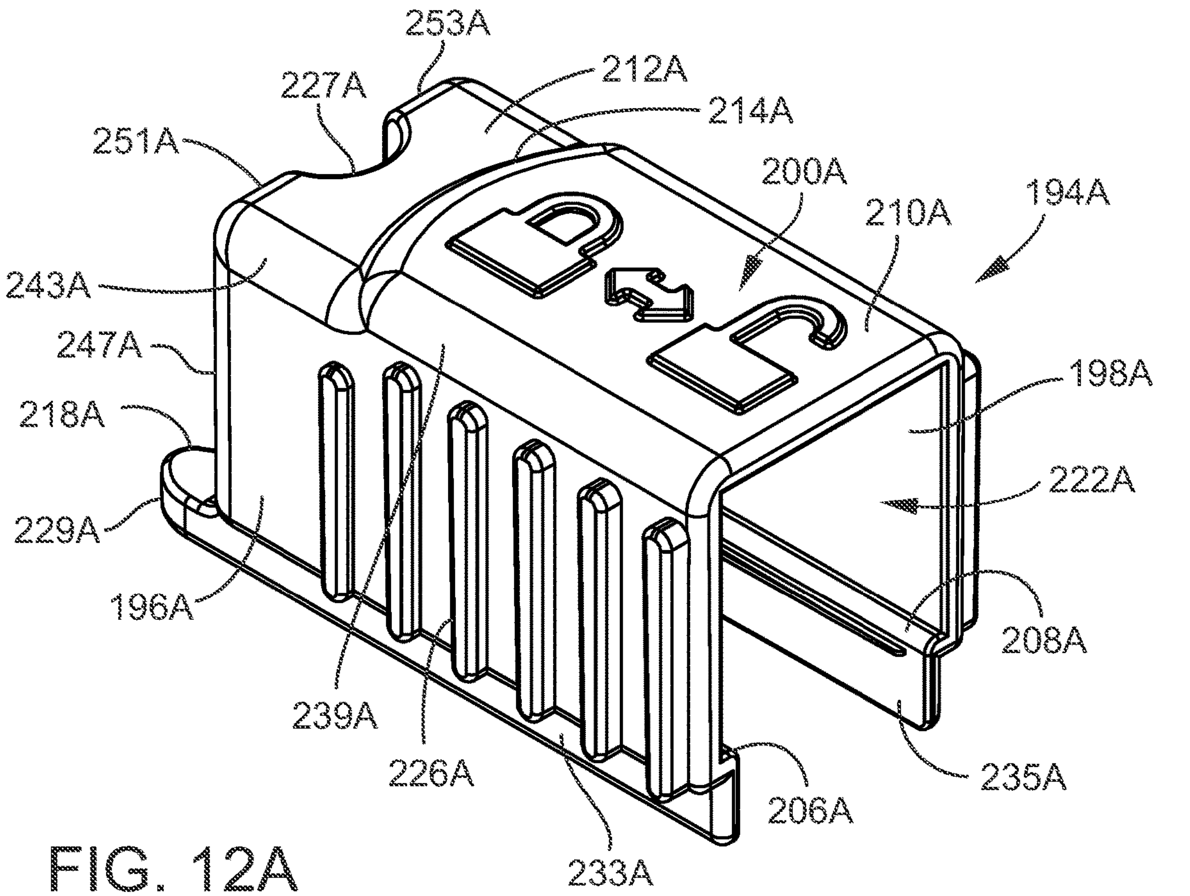
FIG. 12A is a perspective view of another embodiment of the slide of the lift lock of FIG. 1.
Figure 12B:
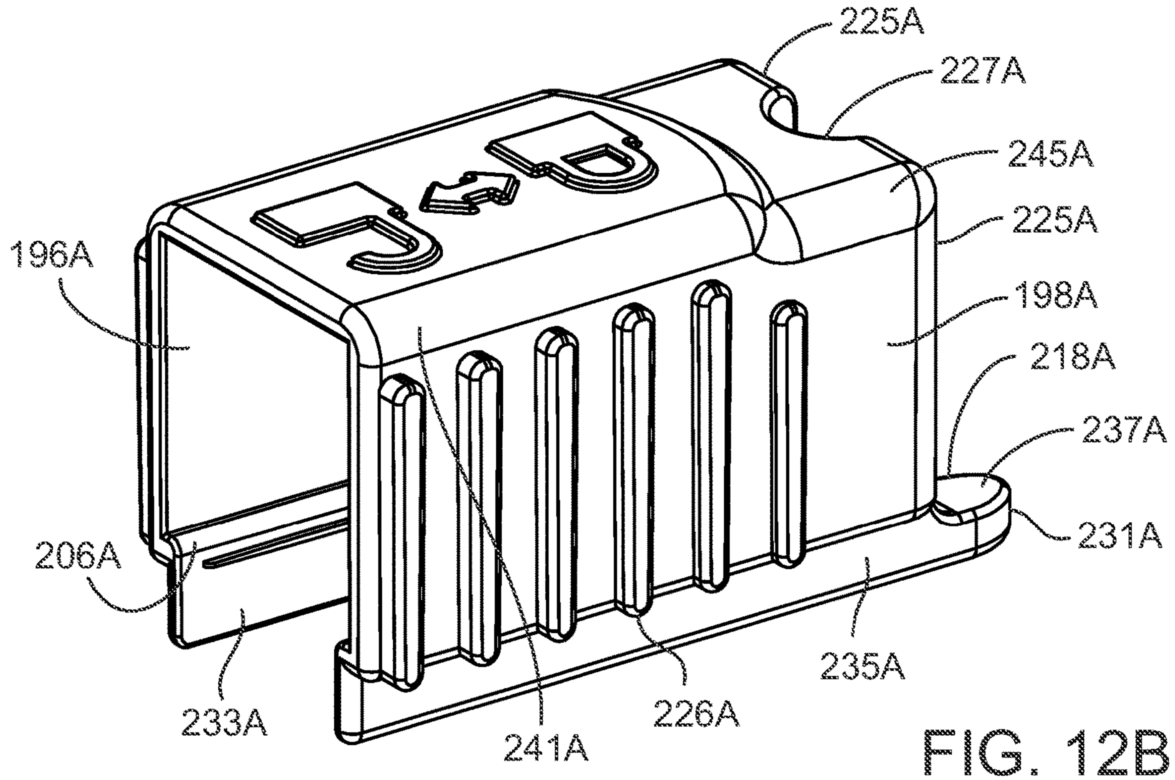
FIG. 12B is a perspective view of the embodiment of the slide of FIG. 12A.
Figure 13A:
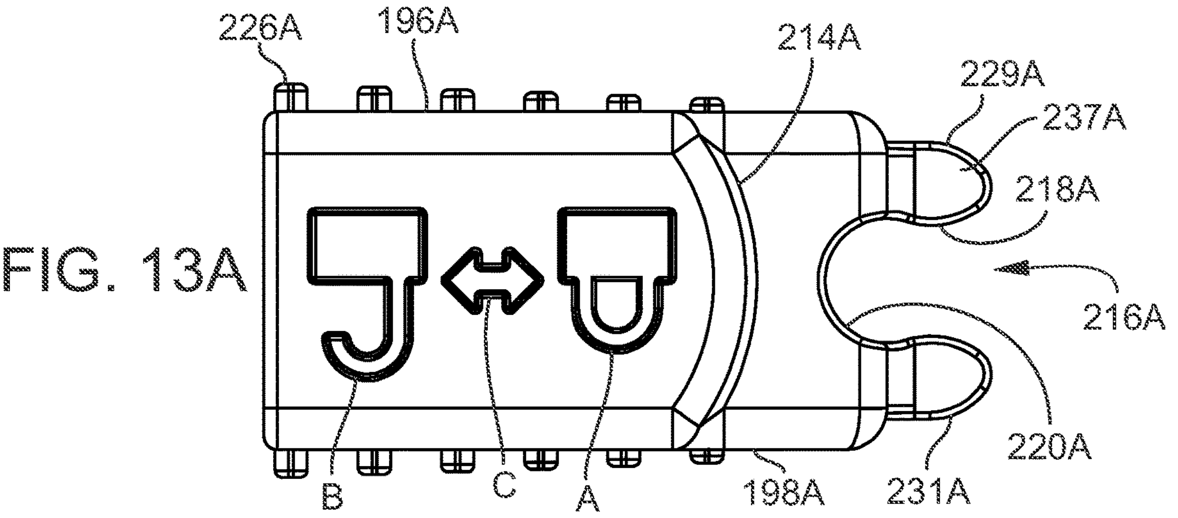
FIG. 13A is a top view of the slide of FIG. 12A.
Figure 13B:
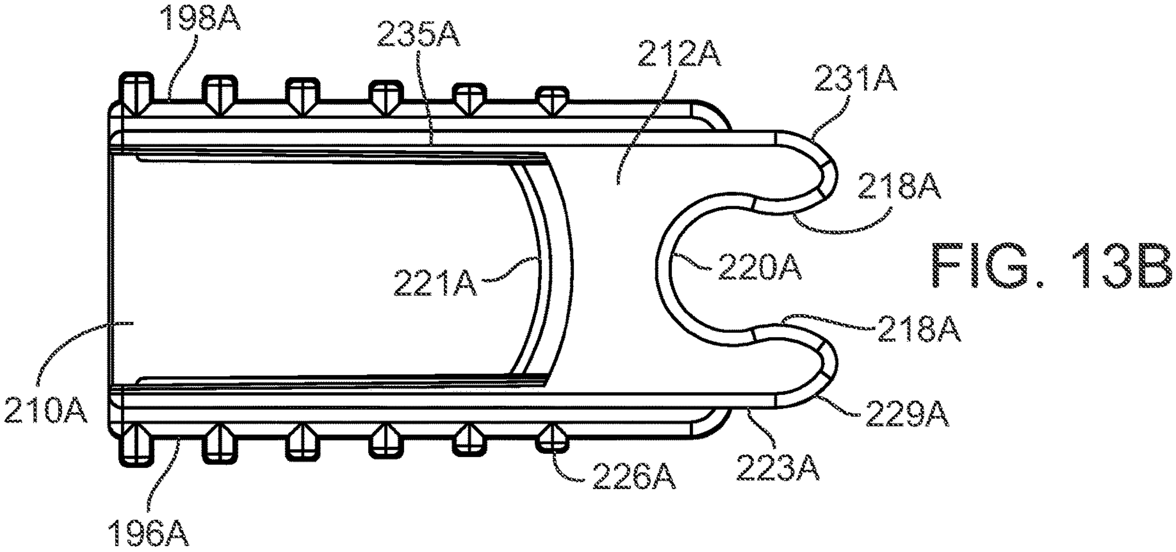
FIG. 13B is a bottom view of the slide of FIG. 12A.
Figure 13C:
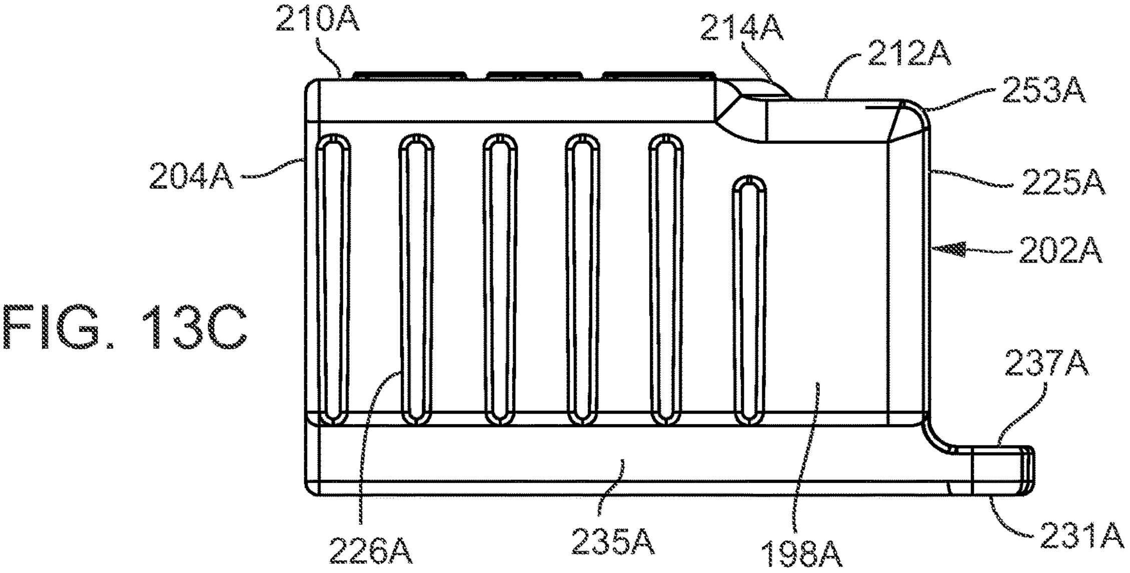
FIG. 13C is an elevation view of the slide of FIG. 12A.
Figure 14A:
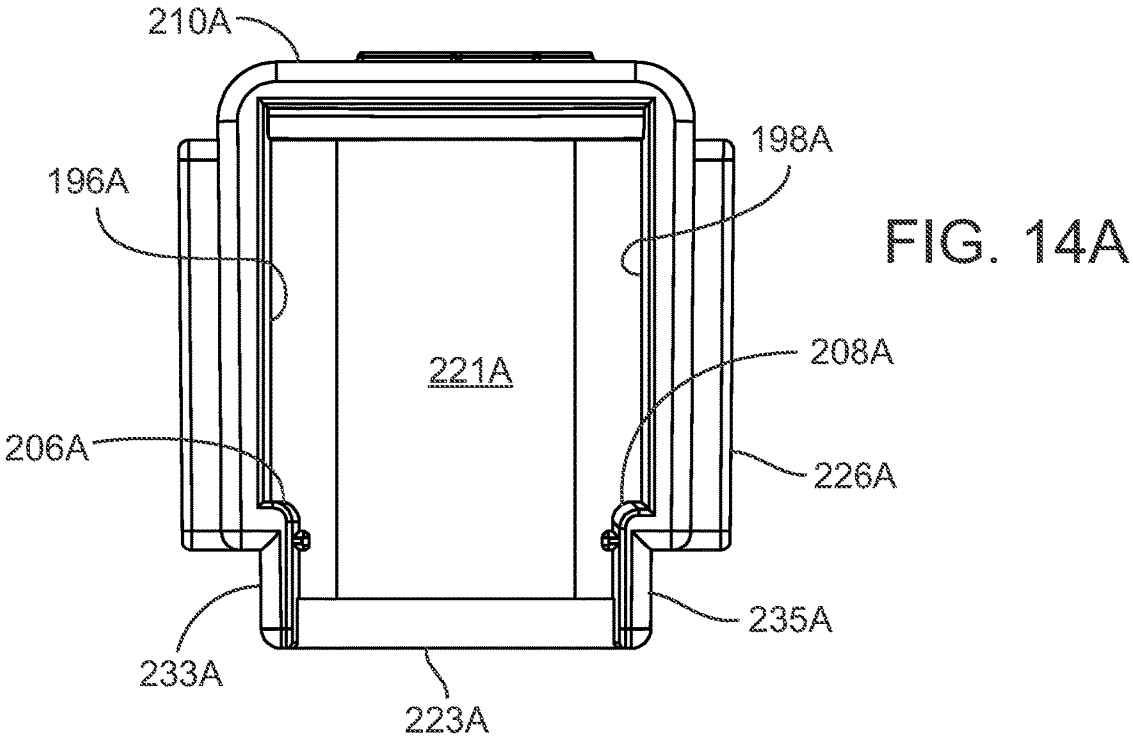
FIG. 14A is a rear end view of the slide of FIG. 12A.
Figure 14B:
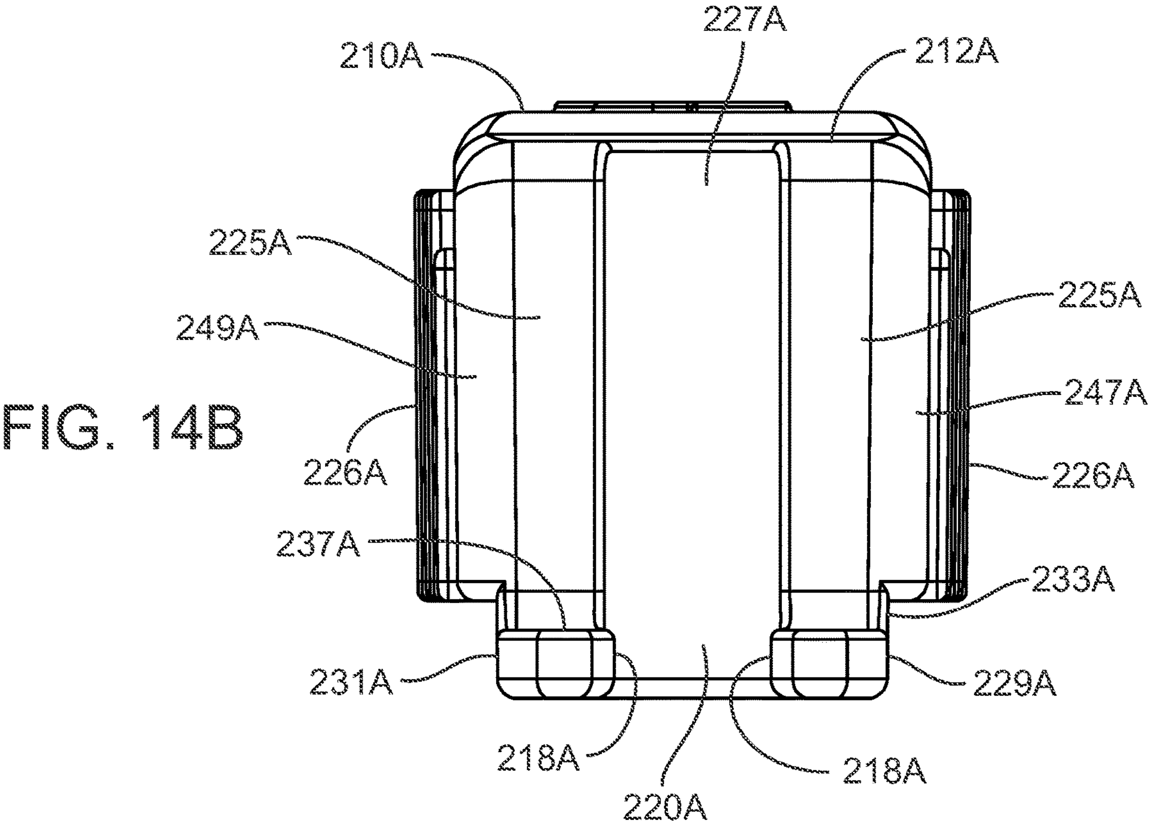
FIG. 14B is a front end view of the slide of FIG. 12B.

FIG. 11 shows a perspective view of another embodiment of the slide 194. The slide 194 of FIG. 11 includes a set of vertical spaced apart ribs 226 on each of the outer faces of sides 196, 198. The ribs 226 provide a roughened surface to the sides 196, 198 for a better manual grip by fingers to slide the slide 194. The bottom of the ribs 226 are disposed adjacent to the runners 206, 208. The tops of four of the ribs 226 are adjacent to ceiling portion 210. The tops of three of the ribs 226 are spaced from ceiling portion 212 and such three rib tops are disposed relative to each other in an oblique fashion. The ribs 226 on side 206 have the same pattern and structure as the ribs 226 on side 208. On each of the sides 196, 198, the ribs 226 extend for substantially the length of each of such sides 196, 198. The terminal ribs 226 are spaced from the ends of the slide 194. Ribs 226 project from the otherwise generally flat surface of sides 196, 198.

Lift lock apparatus 24 includes another embodiment of slide 194. This is slide 194A shown in FIGS. 12A, 12B, 13A, 13B, 13C, 14A, and 14B.

Slide 194A engages upper receptor portion or slide mount 152. Slide 194A includes a rear side 196A, a front side 198A, a two level top 200A, a first end wall 202A, and a second end wall 204A. Slide 194A further includes a rear inset floor portion or rear runner 206A and a front inset floor portion or front runner 208A. Rear runner 206A runs longitudinally the length of the rear side 196A and is inset inwardly from the rear side 196A. Front runner 208A runs longitudinally the length of the front side 198A and is inset inwardly from the front side 198A. Rear runner 206A engages track 185 of the slide mount 152. Front runner 208A engages track 197 of the slide mount 152. The inside face of rear wall 196A of slide 194A abuts and slides against the outside face of rear wall 160 of slide mount 152. The inside face of front wall 198A of slide 194A abuts and slides against the outside face of front wall 162 of slide mount 152.

Top 200A of slide 194A includes two levels. Ceiling portion 210A is disposed at a higher level than ceiling portion 212A. Ceiling portion 210A tapers downwardly into ceiling portion 212A through a transition 214A. A horizontal section of transition 214A defines a curved or round segment having an axis. The inner surface of transition 214A is a stop that abuts against the outside surface of transition 157 of slide mount 152 to define the innermost limit of an inwardly sliding of slide 194A, i.e., in the direction toward gate 16 when gate 16 is in the closed position.

The outer surface of ceiling portion 210A includes indicia molded thereon in raised fashion showing which direction slide 194A is slid to unlock the lift lock apparatus 24 and thus permit gate 14 to be lifted and which direction slide 194A is slid to lock the lift lock apparatus 24 and thus lock the gate 14 against being lifted. Shape A represents a closed lock. Shape B represents an open lock. Shape C is a double arrow showing the direction of sliding. Gate 14 is prevented from being lifted when the slide 194A is slid to the closed direction in the direction of shape A. Gate 14 is liftable when slide 194A is slid to the open position in the direction of shape B, provided latch apparatus 18 is open.

Lower ceiling portion 212A includes a snap cut-out 216A for snappingly receiving therein pivot 86. Cut-out 216A includes a resilient neck 218A having a width slightly less than the diameter of pivot 86 and a circular opening 220A having a diameter about the diameter of pivot 86. From the resilient neck 218A outwardly, snap cut-out 216A is flared or widened or tapered to form a guide to better draw in pivot tube 86 to the neck 218A and circular opening 220A. From the resilient neck 218A inwardly, snap cut-out 216A is flared and starts to form the circular opening 220A.

Slide 194A includes an intermediate or interior curved wall 221A extending downwardly from and being coextensive with the transition 214A. Intermediate or interior curved wall 221A extends from a location adjacent to a ceiling of slide 194A to a location adjacent to a bottom of slide 194A. Intermediate curved wall 221A extends to and between the inner surfaces of rear side 196A and front side 198A. Intermediate curved wall 221A extends downwardly from transition 214A to a lower edge portion 223A. Intermediate curved wall 221A is a stop that abuts closed end 156 of the slide mount 152 that complements the inner surface of the transition 214A, which inner surface is a stop that abuts the outside surface of transition 157 of slide mount 152.

Intermediate curved wall 221A and the inner surface of transition 214A define the innermost limit of an inwardly sliding of slide 194A, where such inward sliding is in the direction toward gate 16 when gate 16 is in the closed position.

Slide 194A includes an inner end opening 222A formed by vertical inner edges of sides 196A, 198A and horizontal inner edge of upper ceiling portion 210A. Slide 194A includes the first end wall 202A that extends between vertical outer edges of sides 196A, 198A. First end wall 202A or front end wall 202A includes a pair of laterally extending outer end wall portions 225A that extends inwardly from vertically outer edges of sides 196A, 198A to a cylindrically shaped receptor 227A that is coextensive with circular opening 220A.

Whereas slide 194 includes a cut-out or receptor 216 that runs vertically along from the bottom of the slide 194 to the top of lower ceiling portion 212, the cut-out or receptor 216A of slide 194A are formed by feet 229A and 231A. Feet 229A, 231A project forwardly of laterally extending outer end wall portions 225A from bottom portions of outer end wall portions 225A. Receptor or cut-out 216A of slide 194A is lesser in height than cut-out or receptor 216 of slide 194 and therefore has less surface area and provides less resistance when snapped on and off pivot tube 86. Each of the feet 229A, 231A includes an upper flat platform 237A.

When the cut-out or receptor 216A receives pivot tube 86 such that the pivot tube 86 is engaged by the circular opening 220A, pivot tube 86 is also received in the cylindrically shaped receptor 227A.

Runners 206A and 208A include vertical sub walls 233A and 235A respectively that are inset from respective walls 196A, 198A. Sub walls 233A and 235A are vertically oriented and run from the rear of the slide 194A to feet 229A and 231A, respectively. Sub walls 233A, 235A and feet 229A, 231A share a common bottom horizontally oriented surface. The inner vertically oriented surfaces of sub walls 233A, 235A slide on plate sections 184, 186 that join the upper and lower receptor portions 152, 168.

Slide 194A is resilient and snaps in place over the slide mount 152. Side walls 196A, 198A are resiliently expandable relative to each other. Slide 194A is in the nature of a resilient clip with rails or runners 206A, 208A that are resiliently seated into respective tracks 185, 187.

When slide 194A is in the locked position where the snap cut-out 216A has engaged pivot tube 86, the lower ceiling portion 212A of slide 194A is adjacent to or confronts the lower edge 90 of upper end frame portion 40. If an attempt is made to lift gate 14, the upper end of outermost or proximal end frame member 142 places pressure on top 170 of piece 150, which pressure is transmitted through piece 150 to the ceiling portions 212A, 210A of the slide 194A, which pressure is transmitted to the lower edge 90 of upper frame end portion 40. Even under such pressure, slide 194A may be manually slid to the unlocked out-of-the-way position. The slide 194A is then held at the unlocked position by a friction fit between inside surfaces of the slide 194A and exterior surfaces of the slide mount 152.

Slide 194A includes a set of vertical spaced apart ribs 226A on each of the outer faces of sides 196A, 198A. The ribs 226A provide a roughened surface to the sides 196A, 198A for a better manual grip by fingers to slide the slide 194A. The bottom of the ribs 226A are disposed adjacent to the runners 206A, 208A. The tops of five of the ribs 226A are spaced from and adjacent to upper ceiling portion 210A. The top of one of the ribs 226A is spaced from and adjacent to lower ceiling portion 212A. The ribs 226A on side 206A have the same pattern and structure as the ribs 226A on side 208A. On each of the sides 196A, 198A, the ribs 226A extend for substantially the length of each of such sides 196A, 198A after subtracting the height of the sub walls 233A, 235A and the spacing from their respective ceiling portions 210A, 212A. The distal terminal rib 226A is adjacent to the distal end of the slide 194A. Proximal terminal rib 226A is disposed just forwardly of the transition 214A. Ribs 226A project from the otherwise generally flat surface of sides 196A, 198A. From each of the top and bottom views shown in FIGS. 13A, 13B, respectively, it can be seen that the widths of the ribs 226A increase from the proximal end of the slide 194A to the distal end of the slide 194A. The widths of the ribs 226A may also be referred to as lengths of the ribs 226A. The proximalmost first rib 226A has a width or length less than its adjacent second rib 226A, which has a width or length less than the distally adjacent third rib 226A, which has a width or length less than the distally adjacent fourth rib 226A, which has a width or length less than its distally adjacent fifth rib 226A, which has a width or length less than its distally adjacent sixth rib 226A, which sixth rib 226A is the distalmost rib 226A.

Slide 194A includes a number of curved junctions or radii. A curved junction 239A extends from side 196A to upper ceiling portion 210A. A curved junction 241A extends from side 198A to upper ceiling portion 210A. A curved junction 243A extends from side 196A to lower ceiling portion 212A. A curved junction 245A extends from side 198A to lower ceiling portion 212A. A curved junction 247A extends from side 196A to one outer end wall 225A. A curved junction 249A extends from side 198A to the other outer end wall 225A. Transition 214A is a curved junction running downwardly from upper ceiling portion 210A to lower ceiling portion 212A. A curved junction 251A extends from lower ceiling portion 212A to one outer end wall 225A. A curved junction 253A extends from lower ceiling portion 212A to the other outer end wall 225A.

Slide 194A is integral and one-piece.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A gated barrier comprising:

a) a frame, the frame having an upper end portion and a lower end portion;

b) a gate engaged to the frame such that the gate is swingable relative to the frame about a first axis;

c) the gate being liftable relative to the frame such that the gate is liftable on the first axis;

d) the gate having a proximal end and a distal free end;

e) the proximal end of the gate being disposed between the upper end portion and the lower end portion of the frame, the proximal end of the gate being pivotally engaged to the frame for the swinging of the gate relative to the frame;

f) a slide on the gate, the slide having first and second positions;

g) the slide in the first position being disposed on the first axis and between the proximal end of the gate and the upper end portion of the frame such that the proximal end of the gate is not liftable to the upper end portion of the frame;

h) the slide being slideable away from the first axis to the second position, the second position being an out-of-the-way position such that the proximal end of the gate is liftable to be adjacent to the upper end portion of the frame;

i) the first axis being defined by a pivot member engaged to the frame;

j) wherein the slide includes a slot for receiving the pivot member, the slot including a neck having a width less than a diameter of the pivot member, the slot including an opening inwardly of the neck and in communication with the neck, the opening being equal to or slightly larger than the diameter of the pivot member, such that the pivot member snaps into the opening through the neck when the slide is pushed into the first position;

k) wherein the slide includes a front wall and feet projecting forwardly of the front wall, the feet forming said slot; and l) wherein the front wall includes an upper portion and a lower portion, said feet projecting from said lower portion of the front wall.

2. A gated barrier comprising:

a) a frame, the frame having an upper end portion and a lower end portion;

b) a gate engaged to the frame such that the gate is swingable relative to the frame about a first axis;

c) the gate being liftable relative to the frame such that the gate is liftable on the first axis;

d) the gate having a proximal end and a distal free end;

e) the proximal end of the gate being disposed between the upper end portion and the lower end portion of the frame, the proximal end of the gate being pivotally engaged to the frame for the swinging of the gate relative to the frame;

f) a slide on the gate, the slide having first and second positions;

g) the slide in the first position being disposed on the first axis and between the proximal end of the gate and the upper end portion of the frame such that the proximal end of the gate is not liftable to the upper end portion of the frame;

h) the slide being slideable away from the first axis to the second position, the second position being an out-of-the-way position such that the proximal end of the gate is liftable to be adjacent to the upper end portion of the frame;

i) the first axis being defined by a pivot member engaged to the frame;

j) wherein the slide includes a slot for receiving the pivot member, the slot including a neck having a width less than a diameter of the pivot member, the slot including an opening inwardly of the neck and in communication with the neck, the opening being equal to or slightly larger than the diameter of the pivot member, such that the pivot member snaps into the opening through the neck when the slide is pushed into the first position;

k) wherein the slide includes a front wall and feet projecting forwardly of the front wall, the feet forming said slot; and l) wherein the front wall includes an upper portion and a lower portion, the upper portion of the front wall including an indent that receives said pivot member, the indent being circular and extending for less than 180 degrees.

3. A gated barrier comprising:

a) a frame, the frame having an upper end portion and a lower end portion;

b) a gate engaged to the frame such that the gate is swingable relative to the frame about a first axis;

c) the gate being liftable relative to the frame such that the gate is liftable on the first axis;

d) the gate having a proximal end and a distal free end;

e) the proximal end of the gate being disposed between the upper end portion and the lower end portion of the frame, the proximal end of the gate being pivotally engaged to the frame for the swinging of the gate relative to the frame;

f) a slide on the gate, the slide having first and second positions;

g) the slide in the first position being disposed on the first axis and between the proximal end of the gate and the upper end portion of the frame such that the proximal end of the gate is not liftable to the upper end portion of the frame;

h) the slide being slideable away from the first axis to the second position, the second position being an out-of-the-way position such that the proximal end of the gate is liftable to be adjacent to the upper end portion of the frame;

i) the first axis being defined by a pivot member engaged to the frame;

j) wherein the slide includes a slot for receiving the pivot member, the slot including a neck having a width less than a diameter of the pivot member, the slot including an opening inwardly of the neck and in communication with the neck, the opening being equal to or slightly larger than the diameter of the pivot member, such that the pivot member snaps into the opening through the neck when the slide is pushed into the first position;

k) wherein the slide includes a front wall and feet projecting forwardly of the front wall, the feet forming said slot; and l) the slide having first outer walls and second inner walls inset from the first outer walls, each of the second inner walls having a bottom horizontally oriented surface, and each of the feet having a bottom horizontally oriented surface that is co-planar with the bottom horizontally oriented surface of the second inner walls.

* * * * *